US012747418B2

(12) United States Patent
Fernandez Prieto et al.

(10) Patent No.: US 12,747,418 B2
(45) Date of Patent: *Sep. 29, 2026

(54) TREATMENT COMPOSITION WITH DELIVERY PARTICLES MADE FROM REDOX-INITIATOR-TREATED CHITOSAN

(71) Applicant: The Procter & Gamble Company, Cincinnati, OH (US)

(72) Inventors: Susana Fernandez Prieto, Benicarlo (ES); Ariel Lebron, Cincinnati, OH (US); Cédric Marc Tahon, Ghent (BE); Mattia Collu, Saint-Gilles (BE); Johan Smets, Lubbeek (BE); Linsheng Feng, Menasha, WI (US); Travis Ian Bardsley, Appleton, WI (US); Sonia Marcela Malagon Gomez, Appleton, WI (US); Meagan Marie Kochel, Appleton, WI (US)

(73) Assignee: The Procter & Gamble Company, Cincinnati, OH (US)

( * ) Notice: Subject to any disclaimer, the term of this patent is extended or adjusted under 35 U.S.C. 154(b) by 345 days.

This patent is subject to a terminal disclaimer.

(21) Appl. No.: 18/522,477

(22) Filed: Nov. 29, 2023

(65) Prior Publication Data

US 2024/0182818 A1 Jun. 6, 2024

Related U.S. Application Data

(60) Provisional application No. 63/429,194, filed on Dec. 1, 2022.

(51) Int. Cl.

*C11D 3/00* (2006.01)
*C11D 3/39* (2006.01)

(Continued)

(52) U.S. Cl.

CPC ............ *C11D 3/502* (2013.01); *C11D 3/3902* (2013.01); *C11D 17/0039* (2013.01)

(58) Field of Classification Search

CPC ... C11D 3/502; C11D 3/3902; C11D 17/0039; C11D 3/227; C11D 2111/12; B01J 13/16;

(Continued)

(56) References Cited

U.S. PATENT DOCUMENTS 4,138,362 A 2/1979 Vassiliades et al.
5,489,401 A 2/1996 Freeman (Continued)

FOREIGN PATENT DOCUMENTS

CN 103012815 A 4/2013
EP 2832441 A1 2/2015

(Continued)

OTHER PUBLICATIONS

PCT Search Report and Written Opinion for PCT/US2023/081534 dated Apr. 4, 2024, 11 pages.

(Continued)

*Primary Examiner* — Eisa B Elhilo

(74) *Attorney, Agent, or Firm* — Carolyn S. Powell; Andrew J. Mueller

(57) ABSTRACT

A treatment composition that includes a treatment adjunct and a population of core/shell delivery particles, where the shell is made, at least in part, of chitosan treated with a redox initiator. Related methods of making and using such compositions.

20 Claims, 2 Drawing Sheets

(51) Int. Cl.
*C11D 3/50* (2006.01)
*C11D 17/00* (2006.01)

(58) Field of Classification Search
CPC ....... C08B 37/003; C08J 3/24; C08J 2305/08; C08L 5/08
USPC ........................................................ 510/349
See application file for complete search history.

(56) References Cited

U.S. PATENT DOCUMENTS

| | | | |
|---|---|---|---|
| 6,159,918 | A | 12/2000 | Bae-Lee et al. |
| 6,630,437 | B1 | 10/2003 | Murphy et al. |
| 6,632,783 | B1 | 10/2003 | Giblin et al. |
| 6,797,670 | B2 | 9/2004 | Kleban et al. |
| 8,546,509 | B2 | 10/2013 | Kulke et al. |
| 10,085,925 | B2 | 10/2018 | Lei et al. |
| 10,398,632 | B2 | 9/2019 | Aussant et al. |
| 11,382,845 | B2 | 7/2022 | Bulgarelli |
| 2005/0047990 | A1 | 3/2005 | Rees et al. |
| 2005/0047991 | A1 | 3/2005 | Rees et al. |
| 2005/0204477 | A1 | 9/2005 | Casella et al. |
| 2006/0195990 | A1 | 9/2006 | Lagrange |
| 2008/0118568 | A1 | 5/2008 | Smets et al. |
| 2009/0062171 | A1 | 3/2009 | Song et al. |
| 2011/0071064 | A1 | 3/2011 | Lei et al. |
| 2013/0330292 | A1 | 12/2013 | Lei et al. |
| 2015/0252312 | A1 | 9/2015 | De Villeneuve |
| 2016/0158121 | A1 | 6/2016 | Lei et al. |
| 2017/0121649 | A1 | 5/2017 | Shi et al. |
| 2017/0360676 | A1 | 12/2017 | Dihora et al. |
| 2017/0362543 | A1 | 12/2017 | Shen |
| 2018/0015009 | A1 | 1/2018 | Soubiran et al. |
| 2018/0265827 | A1 | 9/2018 | Oh et al. |
| 2019/0040172 | A1 | 2/2019 | Mitchinson et al. |
| 2019/0054440 | A1 | 2/2019 | Mistry |
| 2019/0184364 | A1 | 6/2019 | Brahms et al. |
| 2020/0222873 | A1 | 7/2020 | Neuman et al. |
| 2021/0237021 | A1 | 8/2021 | Akeroyd et al. |
| 2021/0252469 | A1 * | 8/2021 | Feng ........................ B01J 13/22 |
| 2021/0339217 | A1 | 11/2021 | Feng |
| 2022/0071863 | A1 | 3/2022 | Xu et al. |
| 2022/0071865 | A1 | 3/2022 | Sasaki et al. |
| 2022/0125700 | A1 | 4/2022 | Lei et al. |
| 2022/0152572 | A1 * | 5/2022 | Fernandez Prieto .... A61K 8/11 |
| 2022/0161219 | A1 | 5/2022 | Fernandez Prieto et al. |
| 2022/0177815 | A1 | 6/2022 | Popplewell |
| 2023/0049775 | A1 | 2/2023 | Feng |
| 2023/0061781 | A1 | 3/2023 | Fernandez-prieto et al. |
| 2023/0062702 | A1 | 3/2023 | Fernandez-prieto |
| 2024/0017234 | A1 | 1/2024 | Muñoz et al. |
| 2024/0148617 | A1 | 5/2024 | Valmacco |

FOREIGN PATENT DOCUMENTS

| | | | | |
|---|---|---|---|---|
| KR | 100523479 | B1 | 10/2005 | |
| WO | 2011154893 | A1 | 12/2011 | |
| WO | 2012044263 | A2 | 4/2012 | |
| WO | 2015023961 | A1 | 2/2015 | |
| WO | 2016071149 | A1 | 5/2016 | |
| WO | 2017148504 | A1 | 9/2017 | |
| WO | 2017218880 | A1 | 12/2017 | |
| WO | 2018053356 | A1 | 3/2018 | |
| WO | 2018183150 | A1 | 10/2018 | |
| WO | 2019063515 | A1 | 4/2019 | |
| WO | 2019171929 | A1 | 9/2019 | |
| WO | 2019171959 | A1 | 9/2019 | |
| WO | 2019179939 | A1 | 9/2019 | |
| WO | 2019181668 | A1 | 9/2019 | |
| WO | 2019181682 | A1 | 9/2019 | |
| WO | 2019185553 | A1 | 10/2019 | |
| WO | 2019210125 | A1 | 10/2019 | |
| WO | 2020058044 | A1 | 3/2020 | |
| WO | 2020194910 | A1 | 10/2020 | |
| WO | 2020195132 | A1 | 10/2020 | |
| WO | 2020209907 | A1 | 10/2020 | |
| WO | 2020209908 | A1 | 10/2020 | |
| WO | 2020209909 | A1 | 10/2020 | |
| WO | 2021018947 | A1 | 2/2021 | |
| WO | 2021091046 | A1 | 5/2021 | |
| WO | 2021116306 | A1 | 6/2021 | |
| WO | WO 20211163306 | A1 * | 6/2021 | ............. A01N 25/28 |
| WO | 2021161107 | A2 | 8/2021 | |
| WO | 2021163599 | A1 | 8/2021 | |
| WO | 2022109079 | A1 | 5/2022 | |
| WO | 2022109127 | A1 | 5/2022 | |
| WO | 2022207538 | A1 | 10/2022 | |
| WO | 2023006234 | A1 | 2/2023 | |
| WO | 2023019187 | A1 | 2/2023 | |
| WO | 2023019219 | A1 | 2/2023 | |

OTHER PUBLICATIONS

All Office Actions; U.S. Appl. No. 18/522,382, filed Nov. 29, 2023.
All Office Actions; U.S. Appl. No. 18/522,424, filed Nov. 29, 2023.
All Office Actions; U.S. Appl. No. 18/522,443, filed Nov. 29, 2023.
All Office Actions; U.S. Appl. No. 18/522,451, filed Nov. 29, 2023.
All Office Actions; U.S. Appl. No. 18/522,458, filed Nov. 29, 2023.
Gincy Marina Mathew et al. "Chitosan Derivatives: Properties and Applications" vol. 7, No Known Date, pp. 135-161.
Gregorio Crini et al., "Sustainable Agriculture Reviews 35" vol. 35, 2019, pp. 338.
Jose Alexandre Borges Valle et al. "Chitosan microcapsules: Methods of the production and use in the textile finishing" vol. 138, 2021, pp. 29.
Kathleen McDonough et al. "Assessing the biodegradability of microparticles disposed down the drain", vol. 175, Feb. 20, 2017, pp. 452-458.
Lowell H. Hall et al. "The Electrotopological State: An Atom Index for QSAR" vol. 10, 1991, pp. 43-51.
Manuel Jose Lis Arias et al. "Influence of Chitosan Characteristics in the Microencapsulation of Essential Oils" vol. 14, 2021, pp. 119-129.
Shih-Chang Hsu et al. "Free radical degradation of chitosan with potassium persulfate" vol. 75, 2002, pp. 73-83.
Unpublished U.S. Appl. No. 18/522,382, filed Nov. 29, 2023, to Mattia Collu et al.
Unpublished U.S. Appl. No. 18/522,424, filed Nov. 29, 2023, to Ariel Lebron et al.
Unpublished U.S. Appl. No. 18/522,443, filed Nov. 29, 2023, to Amanda Kiser Jukes et al.
Unpublished U.S. Appl. No. 18/522,451, filed Nov. 29, 2023, to Johan Smets et al.
Unpublished U.S. Appl. No. 18/522,458, filed Nov. 29, 2023, to Conny Erna Alice Joos et al.
Types of Random Sampling Techniques Explained, Retrieved from Internet: https://web.archive.org/web/20221219170517/https://builtin.com/data-science/types-of-random-sampling, Dec. 16, 2022, 6 pages.
"Chitosan suppliers & manufacturers in China", Retrieved from Internet: https://web.archive.org/web/20220808071033/https://www.chemicalbookcom/ProdSupplierGNCB1479274_EN.htm, Aug. 8, 2022, 4 pages.

* cited by examiner

TREATMENT COMPOSITION WITH DELIVERY PARTICLES MADE FROM REDOX-INITIATOR-TREATED CHITOSAN

FIELD OF THE INVENTION

The present disclosure relates to a treatment composition that includes a treatment adjunct and a population of core/shell delivery particles, where the shell is made, at least in part, of chitosan treated with a redox initiator. The present disclosure also relates to related methods of making and using such compositions.

BACKGROUND OF THE INVENTION

Delivery particles, particularly core/shell delivery particles, are a convenient way to delivery benefit agents in treatment compositions such as laundry products. For environmental reasons, it may be desirable to use delivery particles that have a wall made from naturally-derived and/or biodegradeable materials.

Delivery particles having a shell made at least in part from chitosan-based materials are known. However, such particles may not delivery the desired level of performance and/or product compatibility. Furthermore, chitosan can be a challenging material to work with due to its viscosity-building tendencies.

There is a need for improved treatment composition that include delivery particles made from chitosan-based materials, as well as related methods.

SUMMARY OF THE INVENTION

The present disclosure relates to treatment compositions that include chitosan-based core/shell delivery particles, where the chitosan used to make the shells is treated with a redox initiator, such as a persulfate or a peroxide.

For example, the present disclosure relates to a treatment composition that includes a treatment adjunct and a population of delivery particles, where the delivery particles include a core and shell surrounding the core, where the core includes a benefit agent, where the shell includes a polymeric material that is the reaction product of a modified chitosan and a cross-linking agent, where the modified chitosan is formed by treating chitosan with a redox initiator, where the redox initiator is selected from the group consisting of a persulfate, a peroxide, and a combination thereof.

The present disclosure also relates to a method of making a treatment composition according to the present disclosure, where the includes the steps of: providing a base composition, where the base composition comprises the treatment adjunct; and combining the population of delivery particles with the base composition.

The present disclosure also relates to a method of treating a surface, where the method includes the step of: contacting the surface, preferably a fabric, with a treatment composition according to the present disclosure.

BRIEF DESCRIPTION OF THE DRAWINGS

The figures herein are illustrative in nature and are not intended to be limiting.

DETAILED DESCRIPTION OF THE INVENTION

Figure 1:
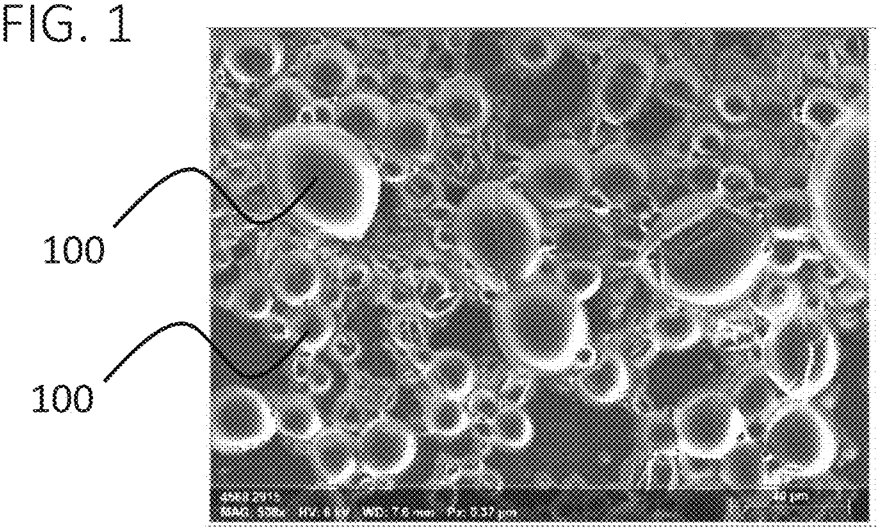
FIG. 1 shows a digital image of delivery particles.

The present disclosure relates to treatment compositions that include delivery particles having shells made, at least in part, from chitosan-based materials. More specifically, the shells include chitosan that has been treated with a redox initiator, such as persulfate or peroxide. The chitosan may further be treated with acid. The resulting modified chitosan is then reacted with a cross-linker to form the shells of the delivery particles.

The resulting particles show benefits in one or more vectors. For example, the delivery particles may be characterized by improved product stability (e.g., in fabric care products), which may be shown by reduced aggregation in slurry or product. The delivery particles may also improved processability, leakage profiles, performance, and/or biodegradability compared to comparative particles that, for example, do not contain chitosan treated with a redox initiator.

Typically, chitosan is a challenging material to use in solution, as it can be difficult to dissolve and/or tends to build viscosity. Without wishing to be bound by theory, it is believed that the redox initiator depolymerizes the chitosan, at least in part. This can result in chitosan solutions characterized by reduced viscosity, which are easier to process and which may contribute to improved particle shell formation.

Additionally treating the chitosan with acid can also be beneficial. The acidic conditions tend to help solubilize the chitosan in water. Acid treatment has also surprisingly been found to increase the molecular weight of the chitosan, yet reduce the viscosity of the water phase. The redox intiator, used before, during, or after the acid treatment, can further reduce the viscosity and lower the molecular weight of the chitosan.

It has been found that treating chitosan as described herein results in effective (and product-compatible) delivery particles that also show promising biodegradability profiles. Without being bound by theory, it is believed that the redox-initiator-treated chitosan may be characterized by relatively low molecular weights and therefore may be easier to break apart during biodegradation processes.

The chitosan treatments, delivery particles, treatment compositions, and related methods of the present disclosure are discussed in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein "consumer product," means baby care, beauty care, fabric & home care, family care, feminine care, and/or health care products or devices intended to be used or consumed in the form in which it is sold, and not intended for subsequent commercial manufacture or modification. Such products include but are not limited to diapers, bibs, wipes; products for and/or methods relating to treating human hair, including bleaching, coloring, dyeing, conditioning, shampooing, styling; deodorants and antiperspirants; personal cleansing; skin care including application of creams, lotions, and other topically applied products for consumer use; and shaving products, products for and/or methods relating to treating fabrics, hard surfaces and any other surfaces in the area of fabric and home care, including: air care, car care, dishwashing, fabric conditioning (including softening), laundry detergency, laundry and rinse additive and/or care, hard surface cleaning and/or treatment, and other cleaning for consumer or institutional use; products and/or methods relating to bath tissue, facial tissue, paper handkerchiefs, and/or paper towels; tampons, feminine napkins; adult incontinence products; products and/or methods relating to oral care including toothpastes, tooth gels, tooth rinses, denture adhesives, tooth whitening; over-the-counter health care including cough and cold remedies; pest control products; and water purification.

As used herein the phrase "fabric care composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

As used herein, "delivery particles," "particles," "encapsulates," "microcapsules," and "capsules" are used interchangeably, unless indicated otherwise. As used herein, these terms typically refer to core/shell delivery particles.

As used herein, "shell" and "wall" are used interchangeably with regard to the delivery particles, unless indicated otherwise.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Treatment Composition

The present disclosure relates to treatment compositions (or simply "compositions" as used herein). The compositions of the present disclosure may comprise a population of delivery particles and a treatment adjunct, each described in more detail below. The treatment compositions may be useful in the methods of treating surfaces, such as fabrics, described herein.

The treatment composition is preferably a consumer product composition. The consumer products compositions of the present disclosure may be useful in baby care, beauty care, fabric care, home care, family care, feminine care, and/or health care applications. The consumer product compositions may be useful for treating a surface, such as fabric, hair, or skin. The consumer product compositions may be intended to be used or consumed in the form in which it is sold. The consumer product compositions of the present disclosure are typically not intended for subsequent commercial manufacture or modification.

The consumer product composition may preferably be a fabric care composition, a hard surface cleaner composition, a dish care composition, a hair care composition (such as shampoo or conditioner), a body cleansing composition, or a mixture thereof, preferably a fabric care composition.

The consumer product composition may be a fabric care composition, such as a laundry detergent composition (including a heavy-duty liquid washing detergent or a unit dose article), a fabric conditioning composition (including a liquid fabric softening and/or enhancing composition), a laundry additive, a fabric pre-treat composition (including a spray, a pourable liquid, or a spray), a fabric refresher composition (including a spray), or a mixture thereof. The treatment composition is preferably a fabric conditioning composition, even more preferably a liquid fabric conditioning composition. The consumer product composition may preferably be a laundry detergent composition, as the delivery particles described herein are found to have improved compatibility in such product matrices (e.g., in products that comprise anionic surfactant).

The composition may be a beauty care composition, such as a hair treatment product (including shampoo and/or conditioner), a skin care product (including a cream, lotion, or other topically applied product for consumer use), a shave care product (including a shaving lotion, foam, or pre- or post-shave treatment), personal cleansing product (including a liquid body wash, a liquid hand soap, and/or a bar soap), a deodorant and/or antiperspirant, or mixtures thereof.

The composition may be a home care composition, such as an air care, car care, dishwashing, hard surface cleaning and/or treatment, and other cleaning for consumer or institutional use.

The treatment composition may be in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

The treatment composition may be in the form of a liquid. The liquid composition may preferably include from about 50% to about 97%, preferably from about 60% to about 96%, more preferably from about 70% to about 95%, or even from about 80% to about 95%, by weight of the fabric treatment composition, of water. The liquid composition may be a liquid fabric conditioner. The liquid may be packaged in a pourable bottle. The liquid may be packaged in an aerosol can or other spray bottle. Suitable containers are described in more detail below.

The treatment composition may be in the form of a solid. The composition may be in the form of a bead or pastille, which may be pastilled from a liquid melt. The composition may be an extruded product. The treatment composition may be in the form of a powder or granules.

The composition may be in the form of a unitized dose article, such as a tablet, a pouch, a sheet, or a fibrous article. Such pouches typically include a water-soluble film, such as a polyvinyl alcohol water-soluble film, that at least partially encapsulates a composition. Suitable films are available from MonoSol, LLC (Indiana, USA). The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof. Pouched compositions may have relatively low amounts of water, for example less than about 20%, or less than about 15%, or less than about 12%, or less than about 10%, or less than about 8%, by weight of the detergent composition, of water.

The treatment composition may be in the form of a spray and may be dispensed, for example, from a bottle via a trigger sprayer and/or an aerosol container with a valve.

The treatment composition may have a viscosity of from 1 to 1500 centipoises (1-1500 mPa*s), from 100 to 1000 centipoises (100-1000 mPa*s), or from 200 to 500 centipoises (200-500 mPa*s) at 20 $s^{-1}$ and 21° C.

The treatment compositions of the present disclosure may be characterized by a pH of from about 2 to about 12, or from about 2 to about 8.5, or from about 2 to about 7, or from about 2 to about 5. The treatment compositions of the present disclosure may have a pH of from about 2 to about 4, preferably a pH of from about 2 to about 3.7, more preferably a pH from about 2 to about 3.5, preferably in the form of an aqueous liquid. It is believed that such pH levels facilitate stability of the quaternary ammonium ester compound, when present. On the other hand, detergent compositions are typically characterized by a pH of from about 7 to about 12, preferably from about 7.5 to about 11. The pH of a composition is determined by dissolving/dispersing the composition in deionized water to form a solution at 10% concentration, at about 20° C.

Additional components and/or features of the compositions are discussed in more detail below.

Population of Delivery Particles

The treatment compositions of the present disclosure comprise a population of delivery particles. The delivery particles comprise a core and a shell surrounding the core. The core may comprise a benefit agent, and optionally a partitioning modifier. The core can be a liquid or a solid, preferably a liquid, at room temperature.

The treatment composition may comprise from about 0.05% to about 20%, or from about 0.05% to about 10%, or from about 0.1% to about 5%, or from about 0.2% to about 2%, by weight of the composition, of delivery particles. The composition may comprise a sufficient amount of delivery particles to provide from about 0.05% to about 10%, or from about 0.1% to about 5%, or from about 0.1% to about 2%, by weight of the composition, of the encapsulated benefit agent, which may preferably be perfume raw materials, to the composition. When discussing herein the amount or weight percentage of the delivery particles, it is meant the sum of the wall material and the core material.

The population of delivery particles according to the present disclosure may be characterized by a volume-weighted median particle size from about 1 to about 100 microns, preferably from about 10 to about 100 microns, preferably from about 15 to about 50 microns, more preferably from about 20 to about 40 microns, even more preferably from about 25 to about 35 microns. For certain compositions, it may be preferred that the population of delivery particles is characterized by a volume-weighted median particle size from about 1 to about 50 microns, preferably from about 5 to about 20 microns, more preferably from about 10 to about 15 microns. Different particle sizes are obtainable by controlling droplet size during emulsification.

The delivery particles may be characterized by a ratio of core to shell up to 99:1, or even 99.5:0.5, on the basis of weight. The shell may be present at a level of from about 1% to about 25%, preferably from about 1% to about 20%, preferably from about 1% to 15%, more preferably from about 5% to about 15%, even more preferably from about 10% to about 15%, even more preferably from about 10% to about 12%, by weight of the delivery particle. The shell may be present at a level of least 1%, preferably at least 3%, more preferably at least 5% by weight of the delivery particle. The shell may be present at a level of up to about 25%, preferably up to about 20%, preferably up to about 15%, more preferably up to about 12%, by weight of the delivery particle.

The delivery particles may be cationic in nature, preferably cationic at a pH of 4.5. The delivery particles may be characterized by a zeta potential of at least 15 millivolts (mV) at a pH of 4.5. The delivery particles can be fashioned to have a zeta potential of at least 15 millivolts (mV) at a pH of 4.5, or even at least 40 mV at a pH of 4.5, or even at least 60 mV at a pH of 4.5. Delivery particles prepared with chitosan typically exhibit positive zeta potentials. Such capsules have improved deposition efficiency on fabrics. At higher pH, the particles may be able to be made nonionic or anionic.

The delivery particles of the present disclosure comprise a shell surrounding a core. (As used herein, "shell" and "wall" are used interchangeably with regard to the delivery particles, unless indicated otherwise.) The shell comprises a polymeric material. The polymeric material is the reaction product of a modified chitosan and a cross-linking agent.

The modified chitosan is formed by treating chitosan with a redox initiator. The redox initiator may be selected from the group consisting of a persulfate, a peroxide, and combinations thereof. The redox initiator may preferably be a persulfate. The redox initiator may preferably be a peroxide.

Treating the chitosan with the redox initiator typically occurs in a water phase, preferably an acidic water phase, prior to forming an emulsion that results in formation of the delivery particles. That being said, a second redox initiator can be added to the emulsion for further improvements to performance and/or product compatibility.

As mentioned above, it is believed that the redox initiator depolymerizes, at least in part, the chitosan and decreases its weight average molecular weight. It has been found that the thus-modified chitosan displays decreased viscosity in a water phase, improved product compatibility (e.g., less aggregation/agglomeration in certain fabric care products), good performance, and/or improved biodegradability.

Suitable redox initiator may include ammonium persulfate, sodium persulfate, potassium persulfate, cesium persulfate, benzoyl peroxide, hydrogen peroxide, and mixtures thereof. The redox initiator may preferably be selected from sodium persulfate, hydrogen peroxide, or mixtures thereof. The redox initiator may preferably be sodium persulfate.

In the reaction that forms the modified chitosan, the redox initiator and the chitosan may be present in a weight ratio of from about 90:10 to about 0.01:99.99, preferably from about 50:50 to about 1:99, more preferably from about 30:70 to about 3:97.

The shells of the delivery particles may comprise sulfur atoms, which can result, for example, from interactions between sulfur-containing redox initiators (e.g., persulfate compounds) and chitosan. For example, when persulfate is employed, the sulfate group is believed to ionically bond with the amino group of chitosan. The sulfur atoms may be present in the shell at a level of from about 0.1% to about 20%, more preferably from about 0.1% to about 10%, even more preferably from about 0.1% to about 1%, by weight of the shell. The presence and amount of sulfur atoms can be determined by Energy Dispersive X-ray microanalysis according to the EDX Method provided in the Test Method section below.

It is believed that it is also beneficial to treat the chitosan under acidic conditions. The acidic conditions can improve the solubility of the chitosan, thereby making it more available to react with the redox initiator. It is also believed that the acidic conditions can affect the molecular weight and/or structure of the chitosan, leading to improved particles and/or performance.

For example, the modified chitosan may be formed under acidic conditions at a temperature of at least 25° C., preferably at a pH of 6.5 or less, preferably less than 6.5, even more preferably at a pH of from about 3 to about 6, more preferably from about 4 to about 6, more preferably from about 5 to about 6, even more preferably from 5.2 to about 6. The acidic conditions may be preferably at a pH of 6.5 or less, preferably less than 6.5, even more preferably at a pH of from 3 to 6.2, or even at pH of from 5 to 6.2.

The chitosan (which, prior to acid treatment and/or redox initiator treatment, may be referred to as raw chitosan or parent chitosan) may preferably be treated at a pH of 6.5 or less with an acid for at least one hour, preferably from about one hour to about three hours, or for a period of time required to obtain a chitosan solution viscosity of not more than about 1500 cps of the acid-treated chitosan, or even not more than 500 cps, at a temperature of from about 25° C. to about 99° C., preferably from about 75° C. to about 95° C.

The modified chitosan may be an acid-treated modified chitosan. For example, the chitosan may be treated with an acid. The acid may comprise a weak acid. The acid preferably comprises a mixture of acids, more preferably a mixture of a first acid and a second acid, wherein the first acid is a strong acid, and wherein the second acid is a weak acid. Preferably, the first acid and the second acid are present in a normality ratio of from about 20:80 to about 80:20, preferably from about 35:65 to about 65:35. The first acid may have a first pKa of less than 1, and the second acid may have a first pKa of 5.5 or less. Preferably, the second acid has a first pKa from 1 to 5.5.

The first acid may comprise, consist essentially of, or consist of a strong acid selected from the group consisting of hydrochloric acid, perchloric acid, nitric acid, sulfuric acid, and a mixture thereof, preferably hydrochloric acid. The second acid may comprise, consist essentially of, or consist of a weak acid selected from the group consisting of formic acid, acetic acid, ascorbic acid, glutamic acid, lactic acid, maleic acid, malic acid, succinic acid, citric acid, acrylic acid, oxalic acid, tartaric acid, and a mixture thereof, preferably formic acid, acetic acid, and a mixture thereof.

The chitosan may be treated with an acid prior to being treated with a redox initiator. However, it may be convenient to treat the chitosan with a redox initiator and an acid simultaneously for at least a portion of the treatment process. For example, the chitosan may be dissolved or dispersed in an acidic water phase, and the redox initiator may be added after dissolution/dispersion. Alternatively, an acid and a redox initiator may be provided to a water phase (in any suitable order), and then chitosan is added and dissolved/dispersed.

It is believed that selecting chitosan and/or modified chitosan with a particular molecular weight can contribute to improved processibility, performance, and/or biodegradability. Chitosan that is relatively too large may result in solutions with high viscosity that are difficult to process. Chitosan that is relatively too small may result in poorer shell formation, likely due to increased solubility of the chitosan, resulting in the chitosan being less likely to migrate to the water/oil interface during shell formation.

The chitosan, prior to treatment with the redox initiator and/or acid, preferably at least prior to treatment with the redox initiator, may be characterized by a weight average molecular weight of from about 100 kDa to about 600 kDa, preferably from about 100 kDa to about 500 kDa, more preferably from about 100 kDa to about 400 kDa, more preferably from about 100 kDa to about 300 kDa, even more preferably from about 100 kDa to about 200 kDa.

The modified chitosan, following treatment with the redox initiator and/or acid, preferably at least following treatment with the redox initiator, may be characterized by a weight average molecular weight of from about 1 kDa to about 600 kDa, preferably from about 5 kDa to about 300 kDa, more preferably from about 10 kDa to about 200 kDa, more preferably from about 15 kDa to about 150 kDa, even more preferably from about 20 kDa to about 100 kDa. The modified chitosan may be characterized by a weight average molecular weight of from about 1 kDa to about 600 kDa, preferably from about 5 kDa to about 300 kDa, more preferably from about 30 kDa to about 100 kDa.

The chitosan may be characterized by a degree of deacetylation of at least 50%, preferably from about 50% to about 99%, more preferably from about 75% to about 90%, even more preferably from about 80% to about 85%. The degree of deacetylation can affect the solubility of the chitosan, which in turn can affect its reactivity or behavior in the process of forming the particle shells. For example, a degree of deacetylation that is too low (e.g., below 50%) results in chitosan that is relatively insoluble and relatively unreactive. A degree of deacetylation that is relatively high can result in chitosan that is very soluble, resulting in relatively little of it traveling to the oil/water interface during shell formation.

The chitosan may further be modified with charged moieties. For example, the chitosan, before or after treatment with the redox initiator, may comprise anionically modified chitosan, cationically modified chitosan, or a combination thereof. Modifying the chitosan in an anionic and/or cationic fashion can change the character of the shell of the delivery particle, for example, by changing the surface charge and/or zeta potential, which can affect the deposition efficiency and/or formulation compatibility of the particles. For example, the modified chitosan may further be modified with a modifying compound, wherein the modifying compound comprises an epoxide, an aldehyde, an α,β-unsaturated compound, or a combination thereof.

As mentioned above, the shell is a polymeric material that is the reaction product of the chitosan and a cross-linking agent. Preferably, the cross-linking agent comprises a polyisocyanate. Thus, the shell of the delivery particles may comprise a polyurea resin, wherein the polyurea resin comprises the reaction product of a polyisocyanate and a chitosan.

The polyisocyanate material useful in the present disclosure is to be understood for purposes hereof as isocyanate monomer, isocyanate oligomer, isocyanate prepolymer, or dimer or trimer of an aliphatic or aromatic isocyanate. By "polyisocyanate," it is intended to mean a material or compound that includes two or more isocyanate moieties. All such monomers, prepolymers, oligomers, or dimers or trimers of aliphatic or aromatic isocyanates are intended encompassed by the term "polyisocyanate" herein. The polyisocyanates useful in the present disclosure comprise isocyanate monomers, oligomers or prepolymers, or dimers or trimers thereof, having at least two isocyanate groups. Preferred cross-linking can be achieved with polyisocyanates having at least three functional groups.

Aromatic polyisocyanates may be preferred; however, aliphatic polyisocyanates and blends thereof may be useful. Aliphatic polyisocyanate is understood as a polyisocyanate which does not comprise any aromatic moiety. Aromatic polyisocyanate is understood as a polyisocyanate which comprises at least one aromatic moiety. The cross-linking agent may comprise a mixture of an aromatic polyisocyanate and an aliphatic polyisocyanate.

The polyisocyanate, when aromatic, can be, but is not limited to, methylene diphenyl isocyanate, toluene diisocyanate, tetramethylxylidene diisocyanate, polyisocyanurate of toluene diisocyanate (commercially available from Bayer under the tradename Desmodur® RC), trimethylol propane-adduct of toluene diisocyanate (commercially available from Bayer under the tradename Desmodur® L75), naphthalene-1,5-diisocyanate, phenylene diisocyanate, or trimethylol propane-adduct of xylylene diisocyanate (commercially available from Mitsui Chemicals under the tradename Takenate® D-110N).

Aliphatic polyisocyanates may include a trimer of hexamethylene diisocyanate, a trimer of isophorone diisocyanate, a trimethylol propane-adduct of hexamethylene diisocyanate (available from Mitsui Chemicals) or a biuret of hexamethylene diisocyanate (commercially available from Bayer under the tradename Desmodur® N 100).

Derivatives of polyisocyanates may include oligomers or polymers of isocyanate monomers. As a non-limiting example, the polyisocyanate may preferably comprise an oligomer or polymer of diphenylmethane diisocyanate (MDI), such as Mondur® MR-Light.

The polyisocyanate may preferably be selected from the group consisting of: a polyisocyanurate of toluene diisocyanate; a trimethylol propane adduct of toluene diisocyanate; a trimethylol propane adduct of xylylene diisocyanate; 2,2'-methylenediphenyl diisocyanate; 4,4'-methylenediphenyl diisocyanate; 2,4'-methylenediphenyl diisocyanate; [diisocyanato(phenyl)methyl]benzene; toluene diisocyanate; tetramethylxylidene diisocyanate; naphthalene-1,5-diisocyanate; 1,4-phenylene diisocyanate; 1,3-diisocyanatobenzene; derivatives thereof (such as pre-polymers, oligomers, and/or polymers thereof); and combinations thereof.

The particle shell may also be reinforced using additional co-crosslinkers such as multifunctional amines and/or polyamines, such as diethylene triamine (DETA), polyethylene imine, polyvinyl amine, or mixtures thereof. Acrylates may also be used as additional co-crosslinkers, for example to reinforce the shell.

The polymeric material may be formed in a reaction, where the weight ratio of the chitosan present in the reaction to the cross-linker present in the reaction is from about 1:10 to about 1:0.1. It is believed that selecting desirable ratios of the biopolymer to the cross-linking agent can provide desired ductility benefits, as well as improved biodegradability. It may be preferred that at least 21 wt % of the shell is comprised of moieties derived from chitosan, preferably from acid-treated chitosan. Chitosan as a percentage by weight of the shell may be from about 21% up to about 95% of the shell. The ratio of chitosan in the water phase as compared to the cross-linker, preferably an isocyanate, in the oil phase may be, based on weight, from 21:79 to 90:10, or even from 1:2 to 9:1, or even from 1:1 to 7:1. The polymeric material may be formed in a reaction, where the weight ratio of the chitosan or a derivative thereof (which can include acid-treated chitosan) present in the reaction to the cross-linker present in the reaction is from about 1:10 to about 10:1, preferably from about 1:5 to about 5:1, preferably from about 1:4 to about 5:1, more preferably from about 1:1 to about 5:1, more preferably from about 3:1 to about 5:1. The shell may comprise chitosan at a level of 21 wt % or even greater, preferably from about 21 wt % to about 90 wt %, or even from 21 wt % to 85 wt %, or even 21 wt % to 75 wt %, or 21 wt % to 55 wt % of the total shell being chitosan. The chitosan of this paragraph is preferably modified chitosan as described herein.

The delivery particles may be obtainable, or even made from, a process comprising the steps of: forming a water phase by treating the chitosan with the redox initiator in the presence of water at a pH of 6.5 or less and at a temperature of at least 25° C., preferably for at least one hour and/or to a time at which the water phase is characterized by a viscosity of less than 1500 cp, preferably less than 500 cp viscosity, to form the modified chitosan, preferably wherein the water phase further comprises the mixture of a first acid and a second acid; forming an oil phase, the forming step comprising dissolving together at least one benefit agent and at least one cross-linking agent, preferably a polyisocyante, optionally with an added oil, preferably a partitioning modifier; forming an emulsion by mixing the oil phase into an excess of the water phase, preferably under high shear agitation, thereby forming droplets of the oil phase dispersed in the water phase, and optionally adjusting the pH of the emulsion to be in a range from pH 2 to pH 6; optionally, providing a second redox initiator to the emulsion, wherein the second redox initiator is the same or different as the redox initiator added to the water phase; curing the emulsion at a temperature of at least 40° C. for a time sufficient to form a shell at an interface of the droplets with the water phase, the shell comprising the reaction product of the cross-linking agent and the modified chitosan, and the shell surrounding the core comprising the droplets of the oil phase.

As described above, redox initiator can be added to the water phase and optionally to the emulsion. When redox initiator is added to both phases, the redox initiator provided to the water phase may be considered a first redox initiator, and the redox initiator provided to the emulsion may be considered a second redox initiator. When a second redox initiator is added to the emulsion, the second redox initiator may be the same or different as the (first) redox initiator added to the water phase. For convenience of processing, it may be preferred that the first and second redox initiators are the same. For performance reasons, it may be preferred that the first and second redox initiators are different; for example, it is believed that beneficial results can be achieved with addition of persulfate to the water phase followed by addition of peroxide to the emulsion. The relative amounts of first and second redox initiator may be different. To note, despite the present use of "first" and "second" redox initiator to describe the redox initiator being added at the water phase and/or the emulsion phase, respectively, it is understood that more than one redox initiator may be added at any suitable stage, or even added in portions at any stage.

Although the present disclosure is generally directed to modifying the chitosan with the redox initiator in the water phase (typically further in the presence of acid), it is also contemplated that the chitosan may be modified with the redox initiator later in the particle formation process. For example, it is contemplated that the redox initiator may be added to the emulsion, and possibly, or even preferably, only to the emulsion (e.g., a redox initiator is not provided to the water phase).

Chitosan may be added into water in a jacketed reactor and at pH from 2 or even from 3 to 6.5, adjusted using acid such as concentrated HCl and/or a weak acid such as formic or acetic acid. The redox initiator may be added concurrently to the water phase. The chitosan of this mixture may be acid-treated by heating to elevated temperature, such as 85° C. in 60 minutes, and then may be held at this temperature from 1 minute to 1440 minutes or longer. The water phase then may be cooled to 25° C. Optionally, deacetylating may also be further facilitated or enhanced by enzymes to depolymerize or deacetylate the chitosan. An oil phase may be prepared by dissolving an isocyanate such as trimers of xylylene Diisocyanate (XDI) or polymers of methylene diphenyl isocyanate (MDI), in oil at 25° C. Diluents, for example isopropyl myristate, may be used to adjust the hydrophobicity of the oil phase. The oil phase may then be added into the water phase and milled at high speed to obtain a targeted size. The emulsion may then be cured in one or more heating steps, such as heating to 40° C. in 30 minutes and holding at 40° C. for 60 minutes. Times and temperatures are approximate. The temperature and time are selected to be sufficient to form and cure a shell at the interface of the droplets of the oil phase with the water continuous phase. For example, the emulsion may be heated to 85° C. in 60 minutes and then held at 85° C. for 360 minutes to cure the particles. The slurry may then be cooled to room temperature.

The shell may degrade at least 50% after 20 days (or less) when tested according to test method OECD 301B. The shell may degrade at least 60% of its mass after 60 days (or less) when tested according to test method OECD 301B. The shell may preferably degrade at least 60% of its mass after 60 days (or less) when tested according to test method OECD 301B. The shell may degrade from 30-100%, preferably 40-100%, 50-100%, 60-100%, or 60-95%, in 60 days, preferably 50 days, more preferably 40 days, more preferably 28 days, more preferably 14 days.

The delivery particles of the present disclosure include a core. The core comprises a benefit agent. The core optionally comprises a partitioning modifier.

The core of a particle is surrounded by the shell. When the shell is ruptured, the benefit agent in the core is released. Additionally or alternatively, the benefit agent in the core may diffuse out of the particle, and/or it may be squeezed out. Suitable benefit agents located in the core may include benefit agents that provide benefits to a surface, such as a fabric or hair.

The core may comprise from about 5% to about 100%, by weight of the core, of a benefit agent, which may preferably comprise a fragrance. The core may comprise from about 45% to about 95%, preferably from about 50% to about 80%, more preferably from about 50% to about 70%, by weight of the core, of the benefit agent, which may preferably comprise a fragrance.

The benefit agent may comprise an aldehyde-comprising benefit agent, a ketone-comprising benefit agent, or a combination thereof. Such benefit agents, such as aldehyde- or ketone-containing perfume raw materials, are known to provide preferred benefits, such as freshness benefits. The benefit agent may comprise at least about 20%, preferably at least about 25%, more preferably at least about 40%, even more preferably at least about 50%, by weight of the benefit agent, of aldehyde-containing benefit agents, ketone-containing benefit agents, or combinations thereof.

The benefit agent may be a hydrophobic benefit agent. Such agents are compatible with the oil phases that are common in making the delivery particles of the present disclosure.

The benefit agent is selected so as to provide a benefit under preferred uses of the treatment composition. The benefit agent in the core may be selected from the group consisting of fragrance materials, silicone oils, waxes, hydrocarbons, higher fatty acids, essential oils, lubricants, lipids, skin coolants, vitamins, sunscreens, antioxidants, glycerine, catalysts, bleach particles, silicon dioxide particles, malodor reducing agents, odor-controlling materials, chelating agents, antistatic agents, softening agents, insect and moth repelling agents, colorants, bodying agents, drape and form control agents, smoothness agents, wrinkle control agents, sanitization agents, disinfecting agents, germ control agents, mold control agents, mildew control agents, antiviral agents, drying agents, stain resistance agents, soil release agents, fabric refreshing agents and freshness extending agents, chlorine bleach odor control agents, dye fixatives, dye transfer inhibitors, color maintenance agents, optical brighteners, color restoration/rejuvenation agents, anti-fading agents, whiteness enhancers, anti-abrasion agents, wear resistance agents, fabric integrity agents, anti-wear agents, anti-pilling agents, defoamers, anti-foaming agents, UV protection agents, sun fade inhibitors, anti-allergenic agents, enzymes, water proofing agents, fabric comfort agents, shrinkage resistance agents, stretch resistance agents, stretch recovery agents, skin care agents, synthetic or natural actives, antibacterial actives, antiperspirant actives, cationic polymers, dyes, and mixtures thereof.

The benefit agent in the core preferably comprises fragrance material (or simply "fragrance"), which may include one or more perfume raw materials. Fragrance is particularly suitable for encapsulation in the presently described delivery particles, as the fragrance-containing particles can provide freshness benefits across multiple touchpoints.

The term "perfume raw material" (or "PRM") as used herein refers to compounds having a molecular weight of at least about 100 g/mol and which are useful in imparting an odor, fragrance, essence or scent, either alone or with other perfume raw materials. Typical PRMs comprise inter alia alcohols, ketones, aldehydes, esters, ethers, nitrites and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994).

The PRMs may be characterized by their boiling points (B.P.) measured at the normal pressure (760 mm Hg), and their octanol/water partitioning coefficient (P), which may be described in terms of log P, determined according to the test method below. Based on these characteristics, the PRMs may be categorized as Quadrant I, Quadrant II, Quadrant III, or Quadrant IV perfumes, as described in more detail in U.S. Pat. No. 6,869,923. Suitable Quadrant I, II, III, and IV perfume raw materials are disclosed therein.

Perfume raw materials having a boiling point B.P. lower than about 250° C. and a log P lower than about 3 are known as Quadrant I perfume raw materials. Quadrant I perfume raw materials are preferably limited to less than 30% of the fragrance material.

The fragrance may comprise perfume raw materials that have a log P of from about 2.5 to about 4. It is understood that other perfume raw materials may also be present in the fragrance.

The core of the delivery particles of the present disclosure may comprise a partitioning modifier, which may facilitate more robust shell formation. The partitioning modifier may be combined with the core's perfume oil material prior to incorporation of the wall-forming monomers. The partitioning modifier may be present in the core at a level of from 0% to 95%, preferably from about 5% to about 55%, preferably from about 10% to about 50%, more preferably from about 20% to about 50%, even more preferably from about 25% to about 50%, by weight of the core.

The partitioning modifier may comprise a material selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof. The partitioning modifier may preferably comprise or even consist of isopropyl myristate. The modified vegetable oil may be esterified and/or brominated. The modified vegetable oil may preferably comprise castor oil and/or soy bean oil. US Patent Application Publication 20110268802, incorporated herein by reference, describes other partitioning modifiers that may be useful in the presently described delivery particles.

Where the benefit agent is not itself sufficient to serve as the oil phase or solvent, particularly during the process of forming the shell of the delivery particles for the wall forming materials, the oil phase can comprise a suitable carrier and/or solvent. In this sense, the oil is optional, as the benefit agent itself can at times be the oil. These carriers or solvents are generally an oil, preferably have a boiling point greater than about 80° C. and low volatility and are non-flammable. Though not limited thereto, they preferably comprise one or more esters, preferably with chain lengths of up to 18 carbon atoms or even up to 42 carbon atoms and/or triglycerides such as the esters of C6 to C12 fatty acids and glycerol.

Optionally, the water phase may include an emulsifier. Non-limiting examples of emulsifiers include anionic surfactants (such as alkyl sulfates, alkyl ether sulfates, and/or alkyl benzenesulfonates), nonionic surfactants (such as alkoxylated alcohols, preferably comprising ethoxy groups), polyvinyl alcohol, and/or polyvinyl pyrrolidone. It may be that solubilized chitosan can provide emulsifying benefits in the present applications. Emulsifier, if employed, is typically from about 0.1 to 40% by weight, preferably 0.2 to about 15% by weight, more typically 0.5 to 10% be weight, based on total weight of the aqueous phase.

The population of delivery particles may be provided as a slurry, preferably an aqueous slurry. The slurry can include one or more processing aids, which may include water, aggregate inhibiting materials such as divalent salts, or particle suspending polymers such as xanthan gum, guar gum, cellulose (preferably microfibrillated cellulose) and/or carboxy methyl cellulose. When the delivery particles are characterized by a cationic nature (for example, when the shell is derived, at least in part, from chitosan), a non-anionic structurant, preferably a nonionic structurant, may be preferred, for example, to avoid detrimental charge interactions that may lead to undesirable aggregation.

The slurry can include one or more carriers selected from the group consisting of polar solvents, including but not limited to, water, ethylene glycol, propylene glycol, polyethylene glycol, glycerol; nonpolar solvents, including but not limited to, mineral oil, perfume raw materials, silicone oils, hydrocarbon paraffin oils; and mixtures thereof. Aqueous slurries may be preferred. The slurry may comprise non-encapsulated (of "free") perfume raw materials that are different in identity and/or amount from those that are encapsulated in the cores of the delivery particles.

The slurry may include a deposition aid that may comprise a polymer selected from the group comprising: polysaccharides, such as chitosan, cationically modified starch and/or cationically modified guar; polysiloxanes; poly diallyl dimethyl ammonium halides; copolymers of poly diallyl dimethyl ammonium chloride and polyvinyl pyrrolidone; a composition comprising polyethylene glycol and polyvinyl pyrrolidone; acrylamides; imidazoles; imidazolinium halides; polyvinyl amine; copolymers of poly vinyl amine and N-vinyl formamide; polyvinyl formamide, polyvinyl alcohol; polyvinyl alcohol crosslinked with boric acid; polyacrylic acid; polyglycerol ether silicone cross-polymers; polyacrylic acids, polyacrylates, copolymers of polyvinylamine and polvyinylalcohol oligomers of amines, in one aspect a diethylenetriamine, ethylene diamine, bis(3-aminopropyl)piperazine, N,N-Bis-(3-aminopropyl)methylamine, tris(2-aminoethyl)amine and mixtures thereof; polyethyleneimine, a derivatized polyethyleneimine, in one aspect an ethoxylated polyethylencimine; a polymeric compound comprising, at least two moieties selected from the moieties consisting of a carboxylic acid moiety, an amine moiety, a hydroxyl moiety, and a nitrile moiety on a backbone of polybutadiene, polyisoprene, polybutadiene/styrene, polybutadiene/acrylonitrile, carboxyl-terminated polybutadiene/acrylonitrile or combinations thereof; pre-formed coacervates of anionic surfactants combined with cationic polymers; polyamines and mixtures thereof.

At least one population of delivery particles may be contained in an agglomerate and then combined with a distinct population of delivery particles and at least one adjunct material. Said agglomerate may comprise materials selected from the group consisting of silicas, citric acid, sodium carbonate, sodium sulfate, sodium chloride, and binders such as sodium silicates, modified celluloses, polyethylene glycols, polyacrylates, polyacrylic acids, zeolites and mixtures thereof.

Suitable equipment for use in the processes disclosed herein may include continuous stirred tank reactors, homogenizers, turbine agitators, recirculating pumps, paddle mixers, plough shear mixers, ribbon blenders, vertical axis granulators and drum mixers, both in batch and, where available, in continuous process configurations, spray dryers, and extruders. Such equipment can be obtained from Lodige GmbH (Paderborn, Germany), Littleford Day, Inc. (Florence, Ky., U.S.A.), Forberg AS (Larvik, Norway), Glatt Ingenieurtechnik GmbH (Weimar, Germany), Niro (Soeborg, Denmark), Hosokawa Bepex Corp. (Minneapolis, Minn., U.S.A.), Arde Barinco (New Jersey, U.S.A.).

Adjunct Ingredient

The treatment compositions of the present disclosure may comprise one or more adjunct materials in addition to the delivery particles. The adjunct material may provide a benefit in the intended end-use of a composition, or it may be a processing and/or stability aid.

Suitable adjunct materials may include: surfactants, conditioning actives, deposition aids, rheology modifiers or structurants, bleach systems, stabilizers, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, silicones, hueing agents, aesthetic dyes, additional perfumes and perfume delivery systems, structure elasticizing agents, carriers, hydrotropes, processing aids, anti-agglomeration agents, coatings, formaldehyde scavengers, and/or pigments. Preferably, the adjunct materials comprise additional fabric conditioning agents, dyes, pH control agents, solvents, rheology modifiers, structurants, cationic polymers, surfactants, perfume, additional perfume delivery systems, chelants, antioxidants, preservatives, or mixtures thereof.

Depending on the intended form, formulation, and/or end-use, compositions of the present disclosure might not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids, structurants, anti-agglomeration agents, coatings, formaldehyde scavengers, and/or pigments.

The precise nature of these additional components, and levels of incorporation thereof, will depend on the physical form of the composition and the nature of the operation for which it is to be used. However, when one or more adjuncts are present, such one or more adjuncts may be present as detailed below. The following is a non-limiting list of suitable additional adjuncts.

A. Surfactants

The compositions of the present disclosure may comprise surfactant. Surfactants may be useful for providing, for example, cleaning benefits. The compositions may comprise a surfactant system, which may contain one or more surfactants.

The compositions of the present disclosure may include from about 0.1% to about 70%, or from about 2% to about 60%, or from about 5% to about 50%, by weight of the composition, of a surfactant system. Liquid compositions may include from about 5% to about 40%, by weight of the composition, of a surfactant system. Compact formulations, including compact liquids, gels, and/or compositions suitable for a unit dose form, may include from about 25% to about 70%, or from about 30% to about 50%, by weight of the composition, of a surfactant system.

The surfactant system may include anionic surfactant, nonionic surfactant, zwitterionic surfactant, cationic surfactant, amphoteric surfactant, or combinations thereof. The surfactant system may include linear alkyl benzene sulfonate, alkyl ethoxylated sulfate, alkyl sulfate, nonionic surfactant such as ethoxylated alcohol, amine oxide, or mixtures thereof. The surfactants may be, at least in part, derived from natural sources, such as natural feedstock alcohols.

Suitable anionic surfactants may include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates. The anionic surfactants may be linear, branched, or combinations thereof. Preferred surfactants include linear alkyl benzene sulfonate (LAS), alkyl ethoxylated sulfate (AES), alkyl sulfates (AS), or mixtures thereof. Other suitable anionic surfactants include branched modified alkyl benzene sulfonates (MLAS), methyl ester sulfonates (MES), sodium lauryl sulfate (SLS), sodium lauryl ether sulfate (SLES), and/or alkyl ethoxylated carboxylates (AEC). The anionic surfactants may be present in acid form, salt form, or mixtures thereof. The anionic surfactants may be neutralized, in part or in whole, for example, by an alkali metal (e.g., sodium) or an amine (e.g., monoethanolamine). Due to the presence of cationic ester quat material, it may be desirable to limit the amount of anionic surfactant so as to avoid undesirable interactions of the materials; for example, the compositions may comprise less than 5%, preferably less than 3%, more preferably less than 1%, even more preferably less than 0.1%, by weight of the composition, of anionic surfactant.

The surfactant system may include nonionic surfactant. Suitable nonionic surfactants include alkoxylated fatty alcohols, such as ethoxylated fatty alcohols. Other suitable nonionic surfactants include alkoxylated alkyl phenols, alkyl phenol condensates, mid-chain branched alcohols, mid-chain branhed alkyl alkoxylates, alkylpolysaccharides (e.g., alkylpolyglycosides), polyhydroxy fatty acid amides, ether capped poly(oxyalkylated) alcohol surfactants, and mixtures thereof. The alkoxylate units may be ethyleneoxy units, propyleneoxy units, or mixtures thereof. The nonionic surfactants may be linear, branched (e.g., mid-chain branched), or a combination thereof. Specific nonionic surfactants may include alcohols having an average of from about 12 to about 16 carbons, and an average of from about 3 to about 9 ethoxy groups, such as C12-C14 EO7 nonionic surfactant.

Suitable zwitterionic surfactants may include any conventional zwitterionic surfactant, such as betaines, including alkyl dimethyl betaine and cocodimethyl amidopropyl betaine, $C_8$ to $C_{18}$ (for example from $C_{12}$ to $C_{18}$) amine oxides (e.g., $C_{12-14}$ dimethyl amine oxide), and/or sulfo and hydroxy betaines, such as N-alkyl-N,N-dimethylammino-1-propane sulfonate where the alkyl group can be $C_8$ to $C_{18}$, or from $C_{10}$ to $C_{14}$. The zwitterionic surfactant may include amine oxide.

Depending on the formulation and/or the intended end-use, the composition may be substantially free of certain surfactants. For example, liquid fabric enhancer compositions, such as fabric softeners, may be substantially free of anionic surfactant, as such surfactants may negatively interact with cationic ingredients.

It may be that the treatment composition comprises anionic surfactant, as it has been found that the delivery particles of the present disclosure are surprisingly compatible in such products. For example, the consumer product composition may preferably be a laundry detergent composition (e.g., a heavy duty liquid or a soluble unit dose article) that comprises anionic surfactant; such compositions typically comprise additional surfactants (such as nonionic surfactant) and/or other ingredients as well.

B. Conditioning Active

The compositions of the present disclosure may include a conditioning active. Compositions that contain conditioning actives may provide softness, anti-wrinkle, anti-static, conditioning, anti-stretch, color, and/or appearance benefits.

Conditioning actives may be present at a level of from about 1% to about 99%, by weight of the composition. The composition may include from about 1%, or from about 2%, or from about 3%, to about 99%, or to about 75%, or to about 50%, or to about 40%, or to about 35%, or to about 30%, or to about 25%, or to about 20%, or to about 15%, or to about 10%, by weight of the composition, of conditioning active. The composition may include from about 5% to about 30%, by weight of the composition, of conditioning active.

Conditioning actives suitable for compositions of the present disclosure may include quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, or combinations thereof. Preferably the treatment composition is a fabric care composition where the one or more adjunct ingredients comprises quaternary ammonium ester material; such materials are particularly useful in fabric enhancing/conditioning/softening compositions.

The composition may include a quaternary ammonium ester compound, a silicone, or combinations thereof, preferably a combination. The combined total amount of quaternary ammonium ester compound and silicone may be from about 5% to about 70%, or from about 6% to about 50%, or from about 7% to about 40%, or from about 10% to about 30%, or from about 15% to about 25%, by weight of the composition. The composition may include a quaternary ammonium ester compound and silicone in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1.

The composition may contain mixtures of different types of conditioning actives. The compositions of the present disclosure may contain a certain conditioning active but be substantially free of others. For example, the composition may be free of quaternary ammonium ester compounds, silicones, or both. The composition may comprise quaternary ammonium ester compounds but be substantially free of silicone. The composition may comprise silicone but be substantially free of quaternary ammonium ester compounds.

C. Deposition Aid

The compositions of the present disclosure may comprise a deposition aid. As described above, due to the synergistic benefits that flow from the ester quat material and the delivery particles of the present disclosure, relatively less (or even none) of a deposition aid may be require to provide comparable or even improved performance; alternatively, a deposition aid may be used in compositions of the present disclosure to boost performance even more.

Deposition aids can facilitate deposition of delivery particles, conditioning actives, perfumes, or combinations thereof, improving the performance benefits of the compositions and/or allowing for more efficient formulation of such benefit agents. The composition may comprise, by weight of the composition, from 0.0001% to 3%, preferably from 0.0005% to 2%, more preferably from 0.001% to 1%, or from about 0.01% to about 0.5%, or from about 0.05% to about 0.3%, of a deposition aid. The deposition aid may be a cationic or amphoteric polymer, preferably a cationic polymer.

Cationic polymers in general and their methods of manufacture are known in the literature. Suitable cationic polymers may include quaternary ammonium polymers known the "Polyquaternium" polymers, as designated by the International Nomenclature for Cosmetic Ingredients, such as Polyquaternium-6 (poly(diallyldimethylammonium chloride), Polyquaternium-7 (copolymer of acrylamide and diallyldimethylammonium chloride), Polyquaternium-10 (quaternized hydroxyethyl cellulose), Polyquaternium-22 (copolymer of acrylic acid and diallyldimethylammonium chloride), and the like.

The deposition aid may be selected from the group consisting of polyvinylformamide, partially hydroxylated polyvinylformamide, polyvinylamine, polyethylene imine, ethoxylated polyethylene imine, polyvinylalcohol, polyacrylates, and combinations thereof. The cationic polymer may comprise a cationic acrylate.

Deposition aids can be added concomitantly with delivery particles (at the same time with, e.g., encapsulated benefit agents) or directly/independently in the consumer product composition. The weight-average molecular weight of the polymer may be from 500 to 5000000 or from 1000 to 2000000 or from 2500 to 1500000 Dalton, as determined by size exclusion chromatography relative to polyethyleneoxide standards using Refractive Index (RI) detection. The weight-average molecular weight of the cationic polymer may be from 5000 to 37500 Dalton.

D. Rheology Modifier/Structurant

The compositions of the present disclosure may contain a rheology modifier and/or a structurant. Rheology modifiers may be used to "thicken" or "thin" liquid compositions to a desired viscosity. Structurants may be used to facilitate phase stability and/or to suspend or inhibit aggregation of particles in liquid composition, such as the delivery particles as described herein.

Suitable rheology modifiers and/or structurants may include non-polymeric crystalline hydroxyl functional structurants (including those based on hydrogenated castor oil), polymeric structuring agents, cellulosic fibers (for example, microfibrillated cellulose, which may be derived from a bacterial, fungal, or plant origin, including from wood), di-amido gellants, or combinations thereof.

Polymeric structuring agents may be naturally derived or synthetic in origin. Naturally derived polymeric structurants may comprise hydroxyethyl cellulose, hydrophobically modified hydroxyethyl cellulose, carboxymethyl cellulose, polysaccharide derivatives and mixtures thereof. Polysaccharide derivatives may comprise pectine, alginate, arabinogalactan (gum Arabic), carrageenan, gellan gum, xanthan gum, guar gum and mixtures thereof. Synthetic polymeric structurants may comprise polycarboxylates, polyacrylates, hydrophobically modified ethoxylated urethanes, hydrophobically modified non-ionic polyols and mixtures thereof. Polycarboxylate polymers may comprise a polyacrylate, polymethacrylate or mixtures thereof. Polyacrylates may comprise a copolymer of unsaturated mono- or di-carbonic acid and $C_1$-$C_{30}$ alkyl ester of the (meth)acrylic acid. Such copolymers are available from Noveon inc under the tradename Carbopol Aqua 30. Cross-linked polymers, such as cross-linked polyacrylate and/or polymers and/or co-polymers, such as those that further include nonionic monomers such as acrylamide or methacrylamide monomers, may be useful as structurants. Another suitable structurant is sold under the tradename Rheovis CDE, available from BASF.

E. Other Adjuncts

The treatment compositions of the present disclosure may contain other adjuncts that are suitable for inclusion in the product and/or for final usage. For example, the treatment compositions may comprise neat perfume, perfume delivery technologies (such as pro-perfumes and/or encapsulates having non-polyisocyanate/chitosan wall materials), cationic surfactants, cationic polymers, solvents, suds supressors, or combinations thereof.

Method of Making a Treatment Composition

The present disclosure further relates to methods for making a treatment composition, such as those treatment compositions and/or consumer product compositions described herein.

The method may comprise the steps of: providing a base composition, wherein the base composition comprises the treatment adjunct, and combining the population of delivery particles with the base composition. The population of delivery particles may preferably be provided as an aqueous slurry. The base composition is in the form of a liquid composition.

The delivery particles may be combined with the one or more adjunct ingredients when the delivery particles are in one or more forms, including a slurry form, neat particle form, and/or spray dried particle form, preferably slurry form. The delivery particles may be combined with such adjuncts by methods that include mixing and/or spraying.

The treatment compositions of the present disclosure can be formulated into any suitable form and prepared by any process chosen by the formulator. The one or more adjunct ingredients and the delivery particles may be combined in a batch process, in a circulation loop process, and/or by an in-line mixing process. Suitable equipment for use in the processes disclosed herein may include continuous stirred tank reactors, homogenizers, turbine agitators, recirculating pumps, paddle mixers, high shear mixers, static mixers, plough shear mixers, ribbon blenders, vertical axis granulators and drum mixers, both in batch and, where available, in continuous process configurations, spray dryers, and extruders.

The treatment composition may be placed into a container to form a consumer product, as described herein. The container may be a bottle, preferably a plastic bottle. The treatment composition may be placed into an aerosol or other spray container according to known methods.

Method of Treatment

The present disclosure also relates to a method of treating a surface, preferably a fabric. In general, the method includes the step of contacting a surface, preferably a fabric, with a treatment composition according to the present disclosure, where the treatment composition includes a population of delivery particles as described herein.

Additionally or alternatively, the method may include the step of contacting a surface, preferably a fabric, with a population of delivery particles as described herein. The population of delivery particles may be contained in a treatment composition according to the present disclosure, preferably a fabric care composition.

The method may include the step of contacting a fabric, such as a garment, with a treatment composition. The treatment composition comprises a population of delivery particles. The contacting step results in one or more of the delivery particles being deposited on a surface of the fabric. The delivery particles comprise a core and a shell surrounding the core, where the core comprises a benefit agent, preferably a fragrance material that comprises one or more perfume raw materials. The shell comprises a polymeric material that is, for example, the reaction product of chitosan of a particular molecular weight and a cross-linking agent. Suitable treatment compositions and delivery particles are described in more detail above.

The contacting step may occur during a manual laundry process, for example in a wash basin as fabrics are treated by hand, or an automatic laundry process, for example in an automatic washing machine. The contacting step may occur during the wash cycle of an automatic washing machine; in such cases, the treatment composition may be a laundry detergent or a laundry additive. The contacting step may preferably occur during the rinse cycle of an automatic washing machine; in such cases, the treatment composition may be a fabric enhancer, preferably a liquid fabric enhancer. The contacting step may even occur during a drying step of a laundry process, for example in an automatic dryer machine; in such cases, the treatment composition may be in the form of a non-woven dryer sheet or a dryer bar. The contacting step may occur as a result of the treatment composition being directly applied to the fabric, for example in a pretreatment operation or in a "refreshing" step (e.g., for a fabric that has been used or worn since the last wash); in such cases, the treatment composition may be in the form of a liquid, a stick, or a spray, preferably a spray. Contacting the target fabrics relatively late in a laundering process, e.g., during a rinse cycle, improves the likelihood or efficiency of deposition onto the fabrics as they are less likely to be washed down the drain.

The contacting step may occur in the presence of water. The treatment composition may be diluted with water to form a treatment liquor. The treatment composition may be diluted from about 100-fold to about 1500-fold, preferably from 300-fold to about 1000-fold.

Liquors that comprise the disclosed compositions may have a pH of from about 3 to about 11.5. When diluted, such compositions are typically employed at concentrations of from about 500 ppm to about 15,000 ppm in solution. When the wash solvent is water, the water temperature typically ranges from about 5° C. to about 90° C. and, the water to fabric ratio may be typically from about 1:1 to about 30:1.

The dilution may occur in the drum of an automatic washing machine. The treatment composition may be placed into a dispensing drawer of an automatic washing machine. The treatment composition may be dispensed from the dispensing drawer to the drum during a treatment process.

As alluded to above, the method may further comprise a step of drying the fabric that has the one or more delivery particles on the surface of the fabric. The drying step may comprise a passive drying process, such as on a clothesline or drying rack. The drying step may comprise an automatic drying process, such as in an automatic dryer machine.

Combinations

Specifically contemplated combinations of the disclosure are herein described in the following lettered paragraphs. These combinations are intended to be illustrative in nature and are not intended to be limiting.

A. A treatment composition comprising a treatment adjunct and a population of delivery particles, wherein the delivery particles comprise a core and shell surrounding the core, wherein the core comprises a benefit agent, wherein the shell comprises a polymeric material that is the reaction product of a modified chitosan and a cross-linking agent, wherein the modified chitosan is formed by treating chitosan with a redox initiator, wherein the redox initiator is selected from the group consisting of a persulfate, a peroxide, and a combination thereof.

B. The treatment composition according to paragraph A, wherein the redox initiator is selected from the group consisting of ammonium persulfate, sodium persulfate, potassium persulfate, cesium persulfate, benzoyl peroxide, hydrogen peroxide, and mixtures thereof, preferably sodium persulfate, hydrogen peroxide, and mixtures thereof, more preferably sodium persulfate.

C. The treatment composition according to any of paragraphs A or B, wherein the redox initiator and the chitosan are present in a weight ratio of from about 90:10 to about 0.01:99.99, preferably from about 50:50 to about 1:99, more preferably from about 30:70 to about 3:97.

D. The treatment composition according to any of paragraphs A-C, wherein the shells of the delivery particles comprise sulfur atoms, preferably wherein the sulfur atoms are present in the shell at a level of from about 0.1% to about 20%, more preferably from about 0.1% to about 10%, even more preferably from about 0.1% to about 1%, by weight of the shell.

E. The treatment composition according to any of paragraphs A-D, wherein the modified chitosan is formed under acidic conditions at a temperature of at least 25° C., preferably at a pH of 6.5 or less, preferably less than 6.5, even more preferably at a pH of from about 3 to about 6, even more preferably at a pH of from about 4 to about 6, preferably from about 5 to about 6, more preferably from 5.2 to 6; alternatively, preferably at a pH of 6.5 or less, preferably less than 6.5, even more preferably at a pH of from 3 to 6.2, or even at pH of from 5 to 6.2.

F. The treatment composition according to any of paragraphs A-E, wherein the modified chitosan is an acid-treated modified chitosan, wherein the chitosan is further treated with an acid, preferably a mixture of acids, more preferably a mixture of a first acid and a second acid, wherein the first acid is a strong acid, and wherein the second acid is a weak acid, preferably wherein the first acid and the second acid are present in a normality ratio of from about 20:80 to about 80:20, preferably from about 35:65 to about 65:35.

G. The treatment composition according to any of paragraphs A-F, wherein at least one of the following is true: (a) the chitosan, prior to treatment with the redox initiator and/or acid, is characterized by a weight average molecular weight of from about 100 kDa to about 600 kDa, preferably from about 100 kDa to about 500 kDa, more preferably from about 100 kDa to about 400 kDa, more preferably from about 100 kDa to about 300 kDa, even more preferably from about 100 kDa to about 200 kDa; and/or (b) the modified chitosan is characterized by a weight average molecular weight of from about 1 kDa to about 600 kDa, preferably from about 5 kDa to about 300 kDa, more preferably from about 10 kDa to about 200 kDa, more preferably from about 15 kDa to about 150 kDa, even more preferably from about 20 kDa to about 100 kDa.

H. The treatment composition according to any of paragraphs A-G, wherein the cross-linking agent comprises a polyisocyanate, preferably a polyisocyanate selected from the group consisting of: a polyisocyanurate of toluene diisocyanate; a trimethylol propane adduct of toluene diisocyanate; a trimethylol propane adduct of xylylene diisocyanate; 2,2'-methylenediphenyl diisocyanate; 4,4'-methylenediphenyl diisocyanate; 2,4'-methylenediphenyl diisocyanate; [diisocyanato(phenyl)methyl]benzene; toluene diisocyanate; tetramethylxylidene diisocyanate; naphthalene-1,5-diisocyanate; 1,4-phenylene diisocyanate; 1,3-diisocyanatobenzene; derivatives thereof (such as pre-polymers, oligomers, and/or polymers thereof); and combinations thereof.

I. The treatment composition according to any of paragraphs A-H, wherein the reaction product is formed in a reaction, wherein the weight ratio of the chitosan present in the reaction to the cross-linker present in the reaction is from about 1:10 to about 1:0.1.

J. The treatment composition according to any of paragraphs A-I, wherein the shell is present in the delivery particles at a level of about 15 wt % or less, by weight of the delivery particles.

K. The treatment composition according to any of paragraphs A-J, wherein the benefit agent is a fragrance material, preferably a fragrance material comprising perfume raw materials characterized by a log P of from about 2.5 to about 4.5.

L. The treatment composition according to any of paragraphs A-K, wherein the core further comprises a partitioning modifier, optionally present in the core at a level of from about 5% to about 55%, preferably from about 10% to about 50%, more preferably from about 25% to about 50%, by weight of the core, preferably a partitioning modifier selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof, more preferably isopropyl myristate.

M. The treatment composition according to any of paragraphs A-L, wherein the delivery particles are characterized by a volume-weighted median particle size from about 1 to about 100 microns, preferably from about 10 to about 100 microns, preferably from about 15 to about 50 microns, more preferably from about 20 to about 40 microns, even more preferably from about 25 to about 35 microns.

N. The treatment composition according to any of paragraphs A-M, wherein the delivery particles are obtainable from a process comprising the steps of: forming a water phase by treating the chitosan with the redox initiator in the presence of water at a pH of 6.5 or less and at a temperature of at least 25° C., preferably for at least one hour and/or to a time at which the water phase is characterized by a viscosity of less than 1500 cp, preferably less than 500 cp viscosity, to form the modified chitosan, preferably wherein the water phase further comprises the mixture of the first acid and the second acid; forming an oil phase, the forming step comprising dissolving together at least one benefit agent and at least one cross-linking agent, preferably a polyisocyante, optionally with an added oil, preferably a partitioning modifier; forming an emulsion by mixing the oil phase into an excess of the water phase, preferably under high shear agitation, thereby forming droplets of the oil phase dispersed in the water phase, and optionally adjusting the pH of the emulsion to be in a range from pH 2 to pH 6; optionally, providing a second redox initiator to the emulsion, wherein the second redox initiator is the same or different as the redox initiator added to the water phase; curing the emulsion at a temperature of at least 40° C. for a time sufficient to form a shell at an interface of the droplets with the water phase, the shell comprising the reaction product of the cross-linking agent and the modified chitosan, and the shell surrounding the core comprising the droplets of the oil phase.

O. The treatment composition according to any of paragraphs A-O, wherein the delivery particles are cationic, preferably wherein the delivery particles are characterized by a zeta potential of at least 15 mV at a pH of 4.5.

P. The treatment composition according to any of paragraphs A-O, wherein the modified chitosan is further modified with a modifying compound, wherein the modifying compound comprises an epoxide, an aldehyde, an α,β-unsaturated compound, or a combination thereof.

Q. The treatment composition according to any of paragraphs A-P, wherein the shells of the delivery particles degrade at least 60% in 60 days when tested according to test method OECD 301B.

R. The treatment composition according to any of paragraphs A-Q, wherein the treatment adjunct is selected from the group consisting of surfactants, conditioning actives, deposition aids, rheology modifiers or structurants, bleach systems, stabilizers, builders, chelating agents, dye transfer inhibiting agents, dispersants, enzymes, enzyme stabilizers, catalytic metal complexes, polymeric dispersing agents, clay and soil removal/anti-redeposition agents, brighteners, suds suppressors, silicones, hueing agents, aesthetic dyes, neat perfume, additional perfume delivery systems, structure elasticizing agents, carriers, hydrotropes, processing aids, anti-agglomeration agents, coatings, formaldehyde scavengers, pigments, and mixtures thereof.

S. The treatment composition according to any of paragraphs A-R, wherein the treatment adjunct comprises anionic surfactant, a cationic conditioning agent, or a mixture thereof.

T. The treatment composition according to any of paragraphs A-S, wherein the treatment composition is a fabric care composition, a hard surface cleaner composition, a dish care composition, a hair care composition, a body cleansing composition, or a mixture thereof, preferably a fabric care composition, more preferably a fabric care composition that is a laundry detergent composition, a fabric conditioning composition, a laundry additive, a fabric pre-treat composition, a fabric refresher composition, or a mixture thereof.

U. The treatment composition according to any of paragraphs A-T, wherein the treatment composition is in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof, preferably a liquid composition.

V. The treatment composition according to any of paragraphs A-U, wherein the treatment composition comprises from about 50% to about 99%, by weight of the treatment composition, of water, preferably from about 60% to about 98%, more preferably from about 80% to about 96%, by weight of the treatment composition, of water.

W. A method of making a treatment composition according to any of paragraphs A-V, the method comprising the steps of: providing a base composition, wherein the base composition comprises the treatment adjunct; and combining the population of delivery particles with the base composition.

X. A method of treating a surface, the method comprising the step of: contacting the surface, preferably a fabric, with a treatment composition according to any of paragraphs A-V.

Test Methods

It is understood that the test methods disclosed in the Test Methods section of the present application should be used to determine the respective values of the parameters of Applicant's claimed subject matter as claimed and described herein.

Determination of a Polymer's Molecular Weight and Related Parameters

The following method describing gel permeation chromatograph with multi-angle light scatter and refractive index detection (GPC-MALS/RI) is used to find molecular weight distribution measurements and related values of the polymers described herein.

Gel Permeation Chromatography (GPC) with Multi-Angle Light Scattering (MALS) and Refractive Index (RI) Detection (GPC-MALS/RI) permits the measurement of absolute molecular weight of a polymer without the need for column calibration methods or standards. The GPC system allows molecules to be separated as a function of their molecular size. MALS and RI allow information to be obtained on the number average (Mn) and weight average (Mw) molecular weight.

The Mw distribution of water-soluble polymers like chitosan is typically measured by using a Liquid Chromatography system (e.g., Agilent 1260 Infinity pump system with OpenLab Chemstation software, Agilent Technology, Santa Clara, CA, USA) and a column set (e.g., 2 Tosoh TSKgel G6000WP 7.8×300 mm 13 um pore size, guard column A0022 6 mmx 40 mm PW x1-cp, King of Prussia, PA) which is operated at 40° C. The mobile phase is 0.1M sodium nitrate in water containing 0.02% sodium azide and 0.2% acetic acid. The mobile phase solvent is pumped at a flow rate of 1 mL/min, isocratically. A multiangle light scattering (18-Angle MALS) detector DAWN® and a differential refractive index (RI) detector (Wyatt Technology of Santa Barbara, Calif., USA) controlled by Wyatt Astra® software v8.0 are used.

A sample is typically prepared by dissolving chitosan materials in the mobile phase at ~1 mg per ml and by mixing the solution for overnight hydration at room temperature. The sample is filtered through a 0.8 μm Versapor membrane filter (PALL, Life Sciences, NY, USA) into the LC autosampler vial using a 3-ml syringe before the GPC analysis.

A dn/dc value (differential change of refractive index with concentration, 0.15) is used for the number average molecular weight (Mn), weight average molecular weight (Mw), Z-average molecular weight (Mz), molecular weight of the peak maxima (Mp), and polydispersity (Mw/Mn) determination by the Astra detector software.

Viscosity

Viscosity of liquid finished product is measured using an AR 550 rheometer/viscometer from TA instruments (New Castle, DE, USA), using parallel steel plates of 40 mm diameter and a gap size of 500 μm. The high shear viscosity at 20 $s^{-1}$ and low shear viscosity at 0.05 $s^{-1}$ is obtained from a logarithmic shear rate sweep from 0.01 $s^{-1}$ to 25 $s^{-1}$ in 3 minutes time at 21° C.

Test Method for Determining log P

The value of the log of the Octanol/Water Partition Coefficient (log P) is computed for each material (e.g., each PRM in the perfume mixture) being tested. The log P of an individual material (e.g., a PRM) is calculated using the Consensus log P Computational Model, version 14.02 (Linux) available from Advanced Chemistry Development Inc. (ACD/Labs) (Toronto, Canada) to provide the unitless log P value. The ACD/Labs' Consensus log P Computational Model is part of the ACD/Labs model suite.

Volume-Weighted Particle Size and Size Distribution

The volume-weighted particle size distribution is determined via single-particle optical sensing (SPOS), also called optical particle counting (OPC), using the AccuSizer 780 AD instrument and the accompanying software CW788 version 1.82 (Particle Sizing Systems, Santa Barbara, California, U.S.A.), or equivalent. The instrument is configured with the following conditions and selections: Flow Rate=1 ml/sec; Lower Size Threshold=0.50 μm; Sensor Model Number=Sensor Model Number=LE400-05 or equivalent;

Autodilution=On; Collection time=60 sec; Number channels=512; Vessel fluid volume=50 ml; Max coincidence=9200. The measurement is initiated by putting the sensor into a cold state by flushing with water until background counts are less than 100. A sample of delivery capsules in suspension is introduced, and its density of capsules adjusted with DI water as necessary via autodilution to result in capsule counts of at least 9200 per ml. During a time period of 60 seconds the suspension is analyzed. The resulting volume-weighted PSD data are plotted and recorded, and the values of the desired volume-weighted particle size (e.g., the median/$50^{th}$ percentile, $5^{th}$ percentile, and/or $90^{th}$ percentile) are determined.

Procedure for Determination of % Degradation

To determine % degradation, the procedure set forth in the "OECD Guideline for Testing of Chemicals" 301B $CO_2$ Evolution (Modified Sturm Test), adopted 17 Jul. 1992, is used. For ease of reference, this test method is referred to herein as test method OECD 301B.

Fabric Treatment Method

Miele washing machines were used to treat the fabrics. For each treatment, the washing machine was loaded with 3 kg fabric, comprising 1100 g knitted cotton fabric, 1100 g polyester-cotton fabrics (50/50). Additionally, 18 terry towel cotton tracers are also added, which weigh together about 780 g.

Prior to the test treatment, the load is preconditioned twice, each time using the 95° C. short cotton cycle with 79 g of unperfumed IEC A Base detergent (ex WFK Testgewebe GmbH), followed by two additional 95° C. washes without detergent.

For the test treatment, the load is washed using a 40° C. short cotton cycle, 1200 rpm spin speed with 79 g IEC A Base detergent, which is added at the start of the wash cycle in the appropriate dispenser. A dosage of 35 g of the test fabric treatment composition (i.e., LFE according to the examples) is added in the appropriate dispenser. At the end of the treatment cycle, the terry towel tracers are removed from the washing machine and line-dried overnight.

The next day, the dry terry towel tracers are analyzed by fast headspace GC/MS (gas chromatography mass spectrometry) approach, as described below. All treatments washed at the same day for comparative purpose and analyzed on the same day are reported as "one wash test."

Method to Determine Headspace Concentration Above Treated Dry Fabrics

The cotton tracers are analyzed by a fast headspace GC/MS (gas chromatography mass spectrometry) approach. 4×4 cm aliquots of the terry towel cotton tracers were transferred to 25 ml headspace vials. The fabric samples were equilibrated for 10 minutes@ 65° C. The headspace above the fabrics was sampled via SPME (50/30 µm DVB/Carboxen/PDMS) approach for 5 minutes. The SPME fiber was subsequently on-line thermally desorbed into the GC. The analytes were analyzed by fast GC/MS in full scan mode. Ion extraction of the specific masses of the PRMs was used to calculate the total HS response and perfume headspace composition above the tested legs.

EDX Method

Energy Dispersive X-ray (EDX) microanalysis is an x-ray technique used to identify the elemental composition of materials. The technique can be qualitative or quantitative, and can even provide spatial distribution of elements through mapping because elemental concentrations can be collected from points, along lines, or as maps.

The instrument used in the method as described herein is a Scanning Electron Microscope (SEM) ZEISS 300 equipped with a Bruker Quantax 400 EDX detector.

To analyze delivery particles in a premix or slurry, a 2 µl solution of slurry is deposited on a SEM stub (sample holder) which has previously been cleaned well using acetone and alcohol in sequence.

To analyze delivery particles in a product composition, particles may be extracted according to the "Extraction of delivery particles from finished products" method provided below.

The EDX detector is used according to the manufacturer's instructions to collect the desired data, using the guidance for qualitative and quantitative analysis given below.

The data generated by EDX analysis includes spectra reported in a graph where the x-axis relates to reported X-ray Energy (keV) and the y-axis relates to the intensity of the signal. The graph is characterized by different peaks, each corresponding to the characteristic energy of the detected elements, which subsequently enables definition of the chemical composition of the sample being analyzed.

A. Qualitative Analysis

For a given sample, an elemental mapping is realized to identify the surface arrangement of the detected elements acquiring an area of 140×95 um (corresponding to a magnification of 800 X), using a resolution of 600×400 pixel for 3 minutes.

Figure 2:
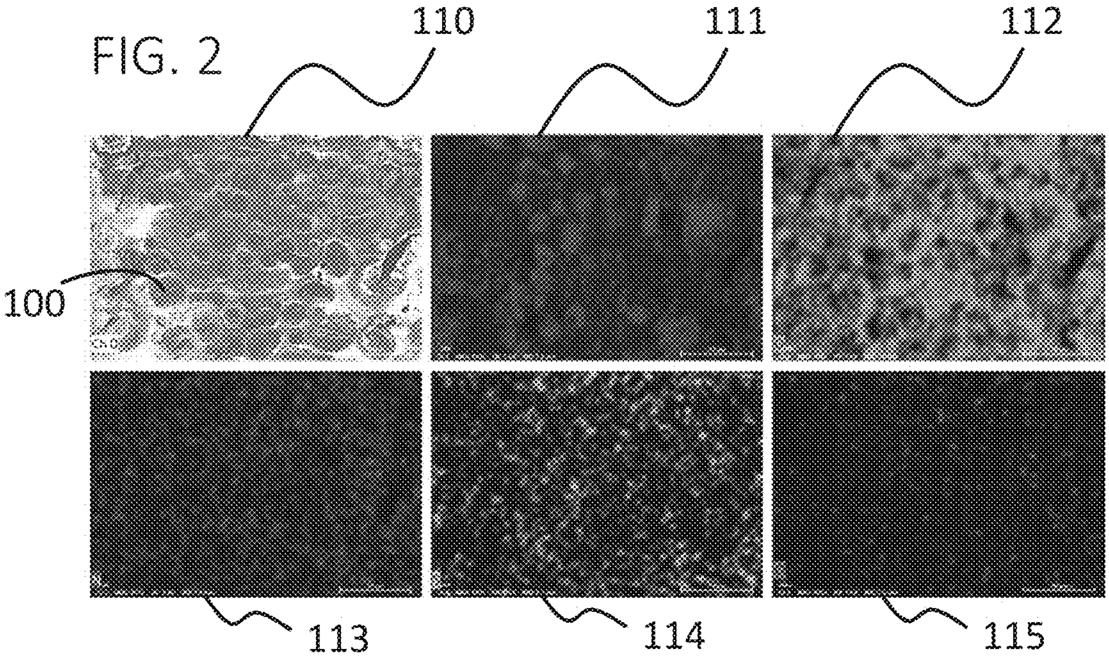
FIG. 2 shows various images associated with the intensity of each peak measured with the EDX method.

The chemical information produced by the EDX technique can be visualized in several ways including elemental mapping. For a specific region of interest (ROI), a digital image can be acquired where the intensity of each position (pixel) is proportional to the intensity of each peak. FIG. 1 shows a digital image of a specific ROI, using a delivery particle slurry sample; numerous delivery particles 100 are shown. FIG. 2 shows various images (originally in color) associated with the intensity of each peak. Typically, the images are in color, and brighter colors are associated with the greater peak intensity. In FIG. 2, the first image 110 shows a representative sample of delivery particles 100. The second image 111 shows an image representing the carbon that is present. The third image 112 shows an image representing the oxygen that is present. The fourth image 113 shows an image representing the nitrogen that is present. The fifth image 114 shows an image representing the sulfur that is present. The sixth image 115 shows an image representing the chlorine that is present.

B. Quantitative Analysis

The EDX technique can be used to detect the presence of elements, as well as their concentration. The MDL (Minimum Detection Limit) of this analytical technique is about 0.1 wt % for quantification element; if the mass concentration is lower than the MDL, the element is not quantified.

Figure 3:
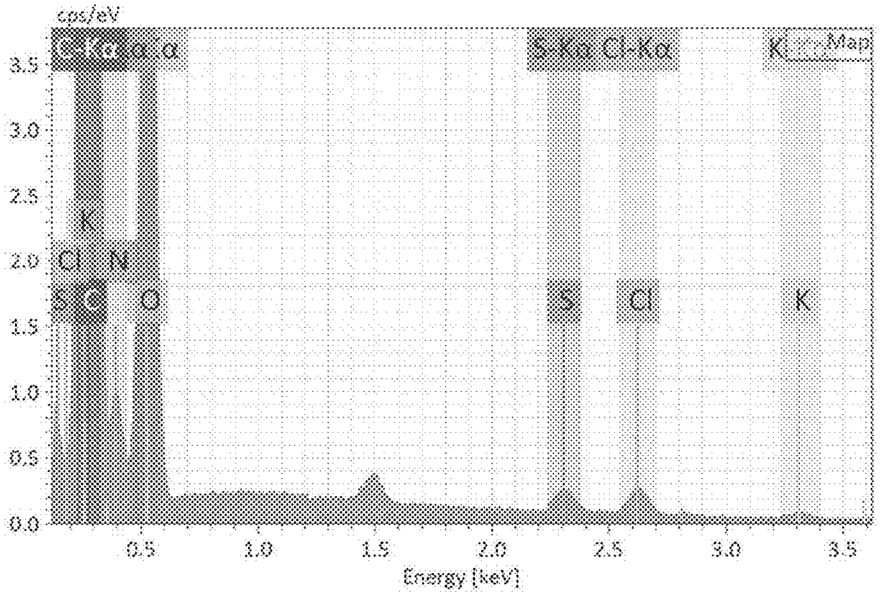
FIG. 3 shows a graph of an EDX spectrum for a given sample.

For the quantitative analysis, an EDX spectrum is acquired in an area of 50 um×40 um for 3 minutes. The output is a spectrum, where the peaks are identified as corresponding to the detected elements; a table is also generated that shows mass percentages and atomic distribution percentages (stoichiometric ratio). FIG. 3 shows a graph of a spectrum for a given sample.

Extraction of Delivery Particles from Finished Products

Except where otherwise specified herein, the preferred method to isolate delivery particles from finished products is based on the fact that the density of most such delivery particles is different from that of water. The finished product is mixed with water in order to dilute and/or release the delivery particles. The diluted product suspension is centrifuged to speed up the separation of the delivery particles.

Such delivery particles tend to float or sink in the diluted solution/dispersion of the finished product. Using a pipette or spatula, the top and bottom layers of this suspension are removed and undergo further rounds of dilution and centrifugation to separate and enrich the delivery particles. The delivery particles are observed using an optical microscope equipped with crossed-polarized filters or differential interference contrast (DIC), at total magnifications of 100× and 400×. The microscopic observations provide an initial indication of the presence, size, quality and aggregation of the delivery particles.

For extraction of delivery particles from a liquid fabric enhancer finished product conduct the following procedure:

1. Place three aliquots of approximately 20 ml of liquid fabric enhancer into three separate 50 ml centrifuge tubes and dilute each aliquot 1:1 with DI water (e.g. 20 ml fabric enhancer+20 ml DI water), mix each aliquot well and centrifuge each aliquot for 30 minutes at approximately 10000×g.
2. After centrifuging per Step 1, discard the bottom water layer (around 10 ml) in each 50 ml centrifuge tube then add 10 ml of DI water to each 50 ml centrifuge tube.
3. For each aliquot, repeat the process of centrifuging, removing the bottom water layer and then adding 10 ml of DI water to each 50 ml centrifuge tube two additional times.
4. Remove the top layer with a spatula or a pipette, and
5. Transfer this top layer into a 1.8 ml centrifuge tube and centrifuge for 5 minutes at approximately 20000×g.
6. Remove the top layer with a spatula and transfer into a new 1.8 ml centrifuge tube and add DI water until the tube is completely filled, then centrifuge for 5 minutes at approximately 20000×g.
7. Remove the bottom layer with a fine pipette and add DI water until tube is completely filled and centrifuge for 5 minutes at approximately 20000×g.
8. Repeat step 7 for an additional 5 times (6 times in total).

If both a top layer and a bottom layer of enriched delivery particles appear in the above described step 1, then, immediately move to step 3 (i.e., omit step 2) and proceed steps with steps 4 through 8. Once those steps have been completed, also remove the bottom layer from the 50 ml centrifuge tube from step 1, using a spatula or/and a pipette. Transfer the bottom layer into a 1.8 ml centrifuge tube and centrifuge 5 min at approximately 20000×g. Remove the bottom layer in a new tube and add DI water until the tube is completely filled then centrifuge for 5 minutes approximately 20000×g. Remove the top layer (water) and add DI water again until the tube is full. Repeat this another 5 times (6 times in total). Recombine the delivery particle enriched and isolated top and bottom layers back together.

If the fabric enhancer has a white color or is difficult to distinguish the delivery particle enriched layers add 4 drops of dye (such as Liquitint Blue JH 5% premix from Milliken & Company, Spartanburg, South Carolina, USA) into the centrifuge tube of step 1 and proceed with the isolation as described.

For extraction of delivery particles from solid finished products that disperse readily in water, mix 1 L of DI water with 20 g of the finished product (e.g. detergent foams, films, gels and granules; or water-soluble polymers; soap flakes and soap bars; and other readily water-soluble matrices such as salts, sugars, clays, and starches). When extracting delivery particles from finished products which do not disperse readily in water, such as waxes, dryer sheets, dryer bars, and greasy materials, it may be necessary to add detergents, agitation, and/or gently heat the product and diluent in order to release the delivery particles from the matrix. The use of organic solvents or drying out of the delivery particles should be avoided during the extraction steps as these actions may damage the delivery particles during this phase.

For extraction of delivery particles from liquid finished products which are not fabric softeners or fabric enhancers (e.g., liquid laundry detergents, liquid dish washing detergents, liquid hand soaps, lotions, shampoos, conditioners, and hair dyes), mix 20 ml of finished product with 20 ml of DI water. If necessary, NaCl (e.g., 1 to 4 g NaCl) can be added to the diluted suspension in order to increase the density of the solution and facilitate the delivery particles floating to the top layer. If the product has a white color which makes it difficult to distinguish the layers of delivery particles formed during centrifugation, a water-soluble dye can be added to the diluent to provide visual contrast.

The water and product mixture is subjected to sequential rounds of centrifugation, involving removal of the top and bottom layers, re-suspension of those layers in new diluent, followed by further centrifugation, isolation and re-suspension. Each round of centrifugation occurs in tubes of 1.5 to 50 ml in volume, using centrifugal forces of up to 20,000×g, for periods of 5 to 30 minutes. At least six rounds of centrifugation are typically needed to extract and clean sufficient delivery particles for testing. For example, the initial round of centrifugation may be conducted in 50 ml tubes spun at 10,000×g for 30 mins, followed by five more rounds of centrifugation where the material from the top and bottom layers is resuspended separately in fresh diluent in 1.8 ml tubes and spun at 20,000×g for 5 mins per round.

If delivery particles are observed microscopically in both the top and bottom layers, then the delivery particles from these two layers are recombined after the final centrifugation step, to create a single sample containing all the delivery particles extracted from that product. The extracted delivery particles should be analyzed as soon as possible but may be stored as a suspension in DI water for up to 14 days before they are analyzed.

One skilled in the art will recognize that various other protocols may be constructed for the extraction and isolation of delivery particles from finished products and will recognize that such methods require validation via a comparison of the resulting measured values, as measured before and after the delivery particles' addition to and extraction from finished product.

Procedure for Measuring Compatibility of Delivery Particles in Laundry Matrix

The compatibility of the delivery particles in laundry matrix is measured by the percentage of the aggregates formed in the laundry detergent matrix. The slurry containing the delivery particles were homogenized by agitation for at least one minutes with an overhead mixer. The homogenized slurry was then added in laundry matrix, such as single unit dose (SUD) matrix at a ratio of 1:40, such as 1 g slurry in 40 g matrix, under mixing. The mixture is mixed for at least 15 minutes at 350 rpm using overhead mixer. The mixture of the delivery particle and laundry matrix was then poured through the 425 μm sieve after mixing. Wash the particle aggregates on the sieve with plenty of deionized (DI) water until no visible laundry matrix is observed. Collect the original and water wash filtrate and then pass through the 212 um sieve to collect any particle aggregates on the 212 um sieve. The particle aggregates were then washed with plenty of DI water until no visible matrix is observed. Combine the particle aggregates from 212 um and 425 um sieve and wash with DI water again to rinse off any remaining matrix. The particle aggregates were then collected and dried in CEM oven to a constant weight to determine the weight of the particle aggregates in laundry matrix. The percent aggregation is calculated by following:

$$\text{Percent aggregate} = \frac{\text{Dry weight of particle aggregates}}{(\text{Weight of slurry}) \times (\%\ \text{Solid of the slurry})} \times 100$$

EXAMPLES

The examples provided below are intended to be illustrative in nature and are not intended to be limiting.

In the following examples, the abbreviations correspond to the materials listed in Table 1.

TABLE 1

| Trade Name | Chemical name | Company/City |
|---|---|---|
| ChitoClear | Chitosan | Primex EHF, Siglufjordur, Iceland |
| Takenate D-110N | Polyisocyanate prepolymer | Mitsui Chemicals America, Inc., Rye Brook, NY |
| | Hydrochloric acid | Avantor Performance Materials, LLC, Radnor, PA |
| | Formic acid | Brenntag Great Lakes, LLC, Wauwatosa, WI |
| | Potassium persulfate | Avantor Performance Materials, LLC, Radnor, PA |
| | Isopropyl myristate | Acme-Hardesty Co., Bule Bell, PA |
| | Hydrogen Peroxide | Avantor Performance Materials, LLC, Radnor, PA |

Comparative Example 1

The Comparative Example 1 is the same as Example 13 in publication US20210252469 A1. A water phase is prepared by dispersing 20.66 g ChitoClear into 439.00 g water while mixing in a jacketed reactor. The pH of the water phase is then adjusted to 4.9 using concentrated HCl under agitation. The water phase temperature is then increased to 85° C. over 60 minutes and then held at 85° C. for a period of time to hydrolyze the ChitoClear. The water phase temperature is then reduced to 25° C. after the hydrolyzing step over a period of 90 minutes. An oil phase is prepared by mixing 159.38 g perfume oil and 23.91 g isopropyl myristate together along with 4.00 g Takenate D-110N at room temperature. The oil phase is added to the water phase under high shear milling to obtain an emulsion. The emulsion is heated to 40° C. over 30 minutes and held for 60 minutes. pH of the emulsion was then adjusted to 2.97 using hydrochloric acid. The emulsion is then heated to 85° C. and maintained at this temperature for 6 hours while mixing. The % degradability is 64.26% at 28 days according to OECD 301B.

Comparative Example 2

The Comparative Example 2 is the same as Example 10 in publication US20210252469 A1. A water phase is prepared by dispersing 20.66 g ChitoClear into 439.00 g water while mixing in a jacketed reactor. The pH of the water phase is then adjusted to 6.0 using concentrated HCl under agitation. The water phase temperature is then increased to 85° C. over 60 minutes and then held at 85° C. for a period of time to hydrolyze the ChitoClear. The water phase temperature is then reduced to 25° C. after the hydrolyzing step over a period of 90 minutes. An oil phase is prepared by mixing 159.38 g perfume oil and 23.91 g isopropyl myristate together along with 4.00 g Takenate D-110N at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing. Encapsulates are obtained and the % degradability of the encapsulates is 11.07% at 28 days according to OECD 301B.

Various data points related to Comparative Examples 1 and 2 are reported in Table 2.

TABLE 2

| Comparative Example | Water phase pH | 1 week leakage | % degradability (28 days) |
|---|---|---|---|
| 1 | 4.9 | 76.18% | 64.26 |
| 2 | 6.0 | 17.45% | 11.07 |

As can be seen in Table 2, encapsulates obtained at a relatively lower pH (4.9) in Comparative 1, degrade more extensively in the OECD degradability test. However, these encapsulates suffer from relatively high leakage. Encapsulates prepared at a slightly higher pH (6) perform better in terms of leakage, but suffer from relatively poorer performance in the degradability test. A need exists for encapsulates which have low leakage. Even more desirable are encapsulates which at the same time have relatively high degradability. Achieving a balance of low leakage yet high degradability has been elusive prior to the invention. Even more elusive have been encapsulates having low leakage, high degradability and compatibility with laundry matrices.

Example 1

An acid and potassium persulfate treated chitosan stock solution is prepared as follows. A potassium persulfate solution was prepared first by dissolving 1.55 g potassium persulfate into 3287.5 g deionized water at 70° C. 154.89 g chitosan ChitoClear was then dispersed into the potassium persulfate solution while mixing in a jacketed reactor. The pH of the chitosan dispersion is then adjusted to 4.30 using 68.37 g concentrated HCl under agitation. The temperature of the chitosan solution is then increased to 85° C. over 60 minutes and then held at 85° C. for a period of time to hydrolyze and depolymerize the chitosan. The temperature is then reduced to 25° C. after the hydrolyzing step over a period of 90 minutes to obtain the acid and potassium persulfate treated chitosan solution. The pH of the chitosan solution is 5.1. The formed chitosan stock solution was used for preparation of capsule in Example 1, 3, 5 and 7.

A water phase is prepared by mixing 420.27 g of the above chitosan stock solution in a jacketed reactor. An oil phase is prepared by mixing 128.30 g perfume and 54.99 g isopropyl myristate together along with 4.01 g Takenate D-110N at room temperature. The oil phase is added to the water phase under high shear milling to obtain an emulsion with desired particle size. The emulsion is heated to 40° C. over 30 minutes and then hold for another 60 minutes. The obtained emulsion is then heated to 90° C. in 60 minutes and maintained at this temperature for 8 hours while mixing before cools down to 25° C. in 90 minutes. The formed capsules have a volume weighted median particle size of 11.71 microns.

Example 2

An acid and potassium persulfate treated chitosan stock solution is prepared as following. A potassium persulfate solution was prepared first by dissolving 1.55 g potassium persulfate ("KPS") into 3287.97 g deionized water at 70° C. 154.90 g chitosan ChitoClear was then dispersed into the potassium persulfate solution while mixing in a jacketed reactor. The pH of the chitosan dispersion is then adjusted to 5.10 using 51.72 g concentrated HCl under agitation. The temperature of the chitosan solution is then increased to 85° C. over 60 minutes and then held at 85° C. for a period of time to hydrolyze and depolymerize the chitosan. The temperature is then reduced to 25° C. after the hydrolyzing step over a period of 90 minutes to obtain the acid and potassium persulfate treated chitosan solution. The pH of the chitosan solution is 5.93. The formed chitosan stock solution was used for preparation of capsule in Example 2, 4, 6 and 8.

A water phase is prepared by mixing 422.15 g of the above chitosan stock solution in a jacketed reactor. An oil phase is prepared by mixing 128.30 g perfume and 54.99 g isopropyl myristate together along with 4.01 g Takenate D-110N at room temperature. The oil phase is added to the water phase under high shear milling to obtain an emulsion with desired particle size. The emulsion is heated to 40° C. over 30 minutes and then hold for another 60 minutes. The obtained emulsion is then heated to 90° C. in 60 minutes and maintained at this temperature for 8 hours while mixing before cools down to 25° C. in 90 minutes. The formed capsules have a volume weighted median particle size of 17.64 microns.

Various data points related to Examples 1 and 2 are reported in Table 3.

As can be seen in Table 3, encapsulates based on added persulfate exhibit degradability, but as can be seen in Example 2, with a slight change in pH the leakage also improves relative to Example 1. Moreover Example 2 in addition to improving leakage relative to Example 1, also exhibits degradability of 39.81% in 28 days. This illustrates that persulfate addition enables achieving a surprising balancing of properties by yielding a degradable capsule which also has relatively diminished leakage. Attributes desired in an encapsulate are one or more of low leakage or degradability or compatibility with matrices such as laundry detergent environments. Example 2 illustrates low leakage and degradability. Example 1 illustrates degradability.

Example 3

A water phase is prepared by mixing 420.27 g of the chitosan stock solution from Example 1 in a jacketed reactor. An oil phase is prepared by mixing 146.63 g perfume and 36.66 g isopropyl myristate together along with 5.55 g Takenate D-110N at room temperature. The oil phase is added to the water phase under high shear milling to obtain an emulsion with desired particle size. The emulsion is heated to 40° C. over 30 minutes and then hold for another 60 minutes. The obtained emulsion is then heated to 90° C. in 60 minutes and maintained at this temperature for 8 hours while mixing before cools down to 25° C. in 90 minutes. The formed capsules have a volume weighted median particle size of 13.32 microns.

Example 4

A water phase is prepared by mixing 422.15 g of the chitosan stock solution from Example 2 in a jacketed reactor. An oil phase is prepared by mixing 146.63 g perfume and 36.66 g isopropyl myristate together along with 5.55 g Takenate D-110N at room temperature. The oil phase is added to the water phase under high shear milling to obtain an emulsion with desired particle size. The emulsion is heated to 40° C. over 30 minutes and then hold for another 60 minutes. The obtained emulsion is then heated to 90° C. in 60 minutes and maintained at this temperature for 8 hours while mixing before cools down to 25° C. in 90 minutes. The formed capsules have a volume weighted median particle size of 14.29 microns.

TABLE 3

| Example # | % KPS of chitosan | Water phase pH | Median Particle Size (micron) | 1 wk leakage (%) | % Degradability (28 days) | % Degradability (60 days) |
|---|---|---|---|---|---|---|
| 1 | 1 | 5.1 | 11.71 | 83.96 | 27.70 | 34.14 |
| 2 | 1 | 6 | 17.64 | 53.83 | 39.81 | 50.35 |

Various data points related to Examples 3 and 4 are reported in Table 4.

TABLE 4

| Example # | % KPS of chitosan | Water phase pH | Median Particle Size (micron) | 1 wk leakage (%) | % Degradability (28 days) | % Degradability (60 days) |
|---|---|---|---|---|---|---|
| 3 | 1 | 5.1 | 13.32 | 44.25 | 13.14 | Not measured |
| 4 | 1 | 6 | 14.29 | 27.20 | 39.97 | 50.52 |

As can be seen in Table 4, encapsulates based on added persulfate exhibit one-week leakage values of 44.25 and 27.20% respectively. Even more surprising, with a subtle adjustment in pH, % degradability increases in these samples from 13.14% to 39.97%. Encapsulates according to the invention consistently display surprising improvement in leakage or degradability or compatibility with matrices. In preferred embodiments, improvement is seen in one category of attributes such as leakage or degradability. More desirably improvement is seen in two categories, such as leakage and degradability, such as shown to be achievable by Example 4 or previously in Example 2. Most desirably improvement is seen in all three categories of leakage, degradability and compatibility. Appropriate selections for example can be drawn from the examples illustrated in Table 8. The parameters of the invention surprising enable assembly of a high performing encapsulate in terms of leakage or degradability or matrix compatibility.

Example 5

A water phase is prepared by mixing 420.27 g of the chitosan stock solution from Example 1 in a jacketed reactor. An oil phase is prepared by mixing 146.63 g perfume and 36.66 g isopropyl myristate together along with 2.49 g Takenate D-110N at room temperature. The oil phase is added to the water phase under high shear milling to obtain an emulsion with desired particle size. The emulsion is heated to 40° C. over 30 minutes and then hold for another 60 minutes. The obtained emulsion is then heated to 90° C. in 60 minutes and maintained at this temperature for 8 hours while mixing before cools down to 25° C. in 90 minutes. The formed capsules have a volume weighted median particle size of 18.06 microns.

Example 6

A water phase is prepared by mixing 422.15 g of the chitosan stock solution from Example 2 in a jacketed reactor. An oil phase is prepared by mixing 146.63 g perfume and 36.66 g isopropyl myristate together along with 2.49 g Takenate D-110N at room temperature. The oil phase is added to the water phase under high shear milling to obtain an emulsion with desired particle size. The emulsion is heated to 40° C. over 30 minutes and then hold for another 60 minutes. The obtained emulsion is then heated to 90° C. in 60 minutes and maintained at this temperature for 8 hours while mixing before cools down to 25° C. in 90 minutes. The formed capsules have a volume weighted median particle size of 11.85 microns.

Various data points related to Examples 5 and 6 are reported in Table 5.

TABLE 5

| Example # | % KPS of chitosan | Water phase pH | Median Particle Size (micron) | 1 wk leakage (%) | % Degradability (28 days) | % Degradability (60 days) |
|---|---|---|---|---|---|---|
| 5 | 1 | 5.1 | 12.71 | 92.82 | 39.16 | 50.51 |
| 6 | 1 | 6 | 11.85 | 67.59 | 49.79 | 55.42 |

Examples 5 and 6 illustrate improved degradability in capsules according to the invention. As pH is adjusted closer to pH 6, a surprising reduction in leakage is noted, in addition to improvement in degradability. These examples reinforce the trend observed in the previous examples that the invention is able to deliver improvements in more than one category of attributes, more particularly in terms of the attributes of leakage, degradability, and compatibility.

Example 7

A water phase is prepared by mixing 420.27 g of the chitosan stock solution from Example 1 in a jacketed reactor. An oil phase is prepared by mixing 164.96 g perfume and 18.33 g isopropyl myristate together along with 4.01 g Takenate D-110N at room temperature. The oil phase is added to the water phase under high shear milling to obtain an emulsion with desired particle size. The emulsion is heated to 40° C. over 30 minutes and then hold for another 60 minutes. The obtained emulsion is then heated to 90° C. in 60 minutes and maintained at this temperature for 8 hours while mixing before cools down to 25° C. in 90 minutes. The formed capsules have a volume weighted median particle size of 20.54 microns.

Example 8

A water phase is prepared by mixing 422.15 g of the chitosan stock solution from Example 2 in a jacketed reactor. An oil phase is prepared by mixing 164.96 g perfume and 18.33 g isopropyl myristate together along with 4.01 g Takenate D-110N at room temperature. The oil phase is added to the water phase under high shear milling to obtain an emulsion with desired particle size. The emulsion is heated to 40° C. over 30 minutes and then hold for another 60 minutes. The obtained emulsion is then heated to 90° C. in 60 minutes and maintained at this temperature for 8 hours while mixing before cools down to 25° C. in 90 minutes. The formed capsules have a volume weighted median particle size of 12.56 microns.

Various data points related to Examples 7 and 8 are reported in Table 6.

TABLE 6

| Example # | % KPS of chitosan | Water phase pH | Median Particle Size (micron) | 1 wk leakage (%) | % Degradability (28 days) | % Degradability (60 days) |
|---|---|---|---|---|---|---|
| 7 | 1 | 5.1 | 12.71 | 92.27 | 22.49 | 27.62 |
| 8 | 1 | 6 | 12.56 | 82.90 | 31.91 | 44.13 |

Examples 7 and 8 illustrate improved degradability in capsules according to the invention. As pH is adjusted closer to pH 6, a reduction in leakage is noted, in addition to improvement in degradability. These examples reinforce the trend observed in the previous examples that the invention is able to deliver improvements in more than one category in terms of the categories of leakage, degradability, and compatibility.

Example 9

An acid and potassium persulfate treated chitosan stock solution is prepared as follows. A potassium persulfate solution was prepared first by dissolving 1.56 g potassium persulfate into 3303.96 g deionized water at room temperature. 155.68 g chitosan ChitoClear was then dispersed into the potassium persulfate solution while mixing in a jacketed reactor. The pH of the chitosan dispersion is then adjusted to 5.80 using 53.88 g concentrated HCl under agitation. The temperature of the chitosan solution is then increased to 85° C. over 60 minutes and then held at 85° C. for a period of time, such as 2 hours, to hydrolyze and depolymerize the chitosan. The temperature is then reduced to 25° C. after the hydrolyzing step over a period of 90 minutes to obtain the acid and potassium persulfate treated chitosan solution. The pH of the chitosan solution is 5.97.

A water phase is prepared by mixing 2101.81 g of the above chitosan stock solution in a jacketed reactor. An oil phase is prepared by mixing 716.14 g perfume and 179.05 g isopropyl myristate together along with 19.58 g Takenate D-110N at room temperature. The oil phase is added to the water phase under high shear milling to obtain an emulsion with desired particle size. The emulsion is heated to 60° C. over 45 minutes. The emulsion is then heated to 85° C. in 60 minutes and maintained at this temperature for 6 hours while mixing before cools down to 25° C. in 90 minutes. The formed capsules have a volume weighted median particle size of 15.69 microns.

Example 10

An acid and potassium persulfate treated chitosan stock solution is prepared as follows. A potassium persulfate solution was prepared first by dissolving 1.56 g potassium persulfate into 3303.96 g deionized water at room temperature. 155.68 g chitosan ChitoClear was then dispersed into the potassium persulfate solution while mixing in a jacketed reactor. The pH of the chitosan dispersion is then adjusted to 5.81 using 52.68 g concentrated HCl under agitation. The temperature of the chitosan solution is then increased to 85° C. over 60 minutes and then held at 85° C. for a period of time, such as 2 hours, to hydrolyze and depolymerize the chitosan. The temperature is then reduced to 25° C. after the hydrolyzing step over a period of 90 minutes to obtain the acid and potassium persulfate treated chitosan solution. The pH of the chitosan solution is 5.90.

A water phase is prepared by mixing 2456.58 g of the above chitosan stock solution in a jacketed reactor. An oil phase is prepared by mixing 714.38 g perfume and 178.6 g isopropyl myristate together along with 27.07 g Takenate D-110N at room temperature. The oil phase is added to the water phase under high shear milling to obtain an emulsion with desired particle size. The emulsion is heated to 60° C. over 45 minutes. The emulsion is then heated to 85° C. in 60 minutes and maintained at this temperature for 6 hours while mixing before cools down to 25° C. in 90 minutes. The formed capsules have a volume weighted median particle size of 20.54 microns.

Various data points related to Examples 9 and 10 are reported in Table 7.

TABLE 7

| Example # | % KPS of chitosan | Water phase pH | Median Particle Size (micron) | 1 wk leakage (%) | % Degradability (28 days) | % Degradability (60 days) |
|---|---|---|---|---|---|---|
| 9 | 1 | 5.97 | 15.69 | 17.60 | 54.64 | 64.82 |
| 10 | 1 | 5.90 | 20.54 | 5.91 | 53.50 | 61.17 |

Examples 9 and 10 illustrate improvements in multiple property categories in terms of improved degradability and improvement in leakage values (lower being better) in capsules according to the invention. As pH is adjusted closer to pH 6, a surprising reduction in leakage is observed, in addition to improvement in degradability. These examples illustrate that the invention is able to deliver improvements in more than one category in terms of the categories of leakage, degradability, and compatibility. Compared to Comparative Example 1 and 2, it is observed that with redox initiator present (KPS), better performance and degradability is observed.

Comparative Example 3

A water phase comprising an acid treated chitosan stock solution is prepared as following. 96.24 g chitosan ChitoClear was dispersed into 2044.09 g deionized water at 25° C. while mixing in a jacketed reactor. The pH of the chitosan dispersion is then adjusted to 5.36 using 42.87 g concentrated HCl under agitation. The temperature of the chitosan solution is then increased to 65° C. over 30 minutes, then to 85° C. over 30 minutes, then to 95° C. over 30 minutes, and then held at 95° C. for 2 hours to hydrolyze and depolymerize the chitosan. The temperature is then reduced to 25° C. after the hydrolyzing step over a period of 90 minutes to obtain the acid treated chitosan solution. The pH of the chitosan solution is 5.40.

An oil phase is prepared by mixing 635.63 g perfume and 158.92 g isopropyl myristate together along with 24.06 g Takenate D-110N at room temperature. The oil phase is added to the water phase under high shear milling to obtain an emulsion with desired particle size. The emulsion is heated to 60° C. over 45 minutes, and then to 85° C. in 60 minutes, and then held at 85° C. for 6 hours before cooled down to 25° C. in 90 minutes. The formed capsules have a volume weighted median particle size of 10.06 microns.

Example 11

A water phase comprising an acid and potassium persulfate treated chitosan stock solution is prepared as following. A potassium persulfate (KPS) solution is prepared by dissolving 0.96 g potassium persulfate into 2056.32 g deionized water at 25° C. while mixing in a jacketed reactor. 96.43 g chitosan ChitoClear was then added into the KPS solution. The pH of the chitosan dispersion is then adjusted to 5.91 using 32.96 g concentrated HCl under agitation. The temperature of the chitosan solution is then increased to 85° C. over 60 minutes, and then held at 85° C. for 2 hours to hydrolyze and depolymerize the chitosan. The temperature is then reduced to 25° C. after the hydrolyzing step over a period of 90 minutes to obtain the acid and potassium persulfate treated chitosan solution. The pH of the chitosan solution is 6.04.

An oil phase is prepared by mixing 636.92 g perfume and 159.24 g isopropyl myristate together along with 24.11 g Takenate D-110N at room temperature. The oil phase is added to the water phase under high shear milling to obtain an emulsion with desired particle size. The emulsion is heated to 60° C. over 45 minutes, and then to 85° C. in 60 minutes, and then held at 85° C. 6 hours, and then cooled down to 25° C. in 90 minutes. The formed capsules have a volume weighted median particle size of 33.97 microns.

Example 12

An acid and potassium persulfate treated chitosan stock solution is prepared as following. 42.08 g chitosan ChitoClear was dispersed into 893.0 g deionized water at 25° C. while mixing in a jacketed reactor. 0.42 g potassium persulfate added and dissolved. The pH of the chitosan dispersion is then adjusted to 5.87 using 14.40 g concentrated HCl under agitation. The temperature of the chitosan solution is then increased to 65° C. over 30 minutes, then to 85° C. over 30 minutes, then to 95° C. over 30 minutes, and then held at 95° C. for 2 hours to hydrolyze and depolymerize the chitosan. The temperature is then reduced to 25° C. after the hydrolyzing step over a period of 90 minutes to obtain the acid and potassium persulfate treated chitosan solution. The pH of the chitosan solution is 5.90.

A water phase is prepared by mixing 433.6 g of the above chitosan stock solution in a jacketed reactor. An oil phase is prepared by mixing 128.86 g perfume and 32.22 g isopropyl myristate together along with 4.88 g Takenate D-110N at room temperature. The oil phase is added to the water phase under high shear milling to obtain an emulsion with desired particle size. The emulsion is heated to 60° C. over 45 minutes, and then to 95° C. in 60 minutes, and then held at 95° C. for 4 hours, then 1.38 g potassium persulfate added and dissolved, then held at 95° C. for 2 hours, and then cooled down to 25° C. in 90 minutes. The formed capsules have a volume weighted median particle size of 36.25 microns.

Example 13

An acid and potassium persulfate treated chitosan stock solution is prepared as following. 42.08 g chitosan ChitoClear was dispersed into 893.1 g deionized water at 25° C. while mixing in a jacketed reactor. 4.20 g potassium persulfate added and dissolved. The pH of the chitosan dispersion is then adjusted to 5.94 using 14.35 g concentrated HCl under agitation. The temperature of the chitosan solution is then increased to 65° C. over 30 minutes, then to 85° C. over 30 minutes, and then held at 85° C. for 2 hours to hydrolyze and depolymerize the chitosan. The temperature is then reduced to 25° C. after the hydrolyzing step over a period of 90 minutes to obtain the acid and potassium persulfate treated chitosan solution. The pH of the chitosan solution is 5.36.

A water phase is prepared by mixing 433.6 g of the chitosan stock solution from Example 13 in a jacketed reactor. An oil phase is prepared by mixing 128.86 g perfume and 32.22 g isopropyl myristate together along with 4.88 g Takenate D-110N at room temperature. The oil phase is added to the water phase under high shear milling to obtain an emulsion with desired particle size. The emulsion is heated to 60° C. over 45 minutes, and then to 85° C. in 60 minutes, and then held at 85° C. 6 hours, and then cooled down to 25° C. in 90 minutes. The formed capsules have a volume weighted median particle size of 50.79 microns.

Example 14

An acid and potassium persulfate treated chitosan stock solution is prepared as following. 42.20 g chitosan ChitoClear was dispersed into 893.1 g deionized water at 25° C. while mixing in a jacketed reactor. 0.42 g potassium persulfate added and dissolved. The pH of the chitosan dispersion is then adjusted to 5.91 using 11.48 g concentrated HCl and 1.25 g 90% Formic Acid under agitation. The temperature of the chitosan solution is then increased to 65° C. over 30 minutes, then to 85° C. over 30 minutes, then to 95° C. over 30 minutes, and then held at 95° C. for 2 hours to hydrolyze and depolymerize the chitosan. The temperature is then reduced to 25° C. after the hydrolyzing step over a period of 90 minutes to obtain the acid and potassium persulfate treated chitosan solution. The pH of the chitosan solution is 5.99. The formed chitosan stock solution was used for preparation of capsules in Examples 14 and 15.

A water phase is prepared by mixing 433.6 g of the chitosan stock solution from Example 14 in a jacketed reactor. An oil phase is prepared by mixing 128.86 g perfume and 32.22 g isopropyl myristate together along with 4.88 g Takenate D-110N at room temperature. The oil phase is added to the water phase under high shear milling to obtain an emulsion with desired particle size. The emulsion is heated to 60° C. over 45 minutes, and then to 95° C. in 60 minutes, and then held at 95° C. 6 hours, and then cooled down to 25° C. in 90 minutes. The formed capsules have a volume weighted median particle size of 33.48 microns.

Example 15

A water phase is prepared by mixing 433.6 g of the chitosan stock solution from Example 14 in a jacketed reactor. An oil phase is prepared by mixing 128.86 g perfume and 32.22 g isopropyl myristate together along with 4.88 g Takenate D-110N at room temperature. The oil phase is added to the water phase under high shear milling to obtain an emulsion with desired particle size. The emulsion is heated to 60° C. over 45 minutes, and then to 95° C. in 60 minutes, and then held at 95° C. for 4 hours, then 1.38 g potassium persulfate added and dissolved, then held at 95° C. for 2 hours, and then cooled down to 25° C. in 90 minutes. The formed capsules have a volume weighted median particle size of 36.25 microns.

Example 16

An acid and potassium persulfate treated chitosan stock solution is prepared as following. 42.15 g chitosan ChitoClear was dispersed into 893.1 g deionized water at 25° C. while mixing in a jacketed reactor. 0.42 g potassium persulfate added and dissolved. The pH of the chitosan dispersion is then adjusted to 5.92 using 8.66 g concentrated HCl and 2.52 g 90% Formic Acid under agitation. The temperature of the chitosan solution is then increased to 65° C. over 30 minutes, then to 85° C. over 30 minutes, then to 95° C. over 30 minutes, and then held at 95° C. for 2 hours to hydrolyze and depolymerize the chitosan. The temperature is then reduced to 25° C. after the hydrolyzing step over a period of 90 minutes to obtain the acid and potassium persulfate treated chitosan solution. The pH of the chitosan solution is 6.01. The formed chitosan stock solution was used for preparation of capsule in Example 16 and 17.

A water phase is prepared by mixing 433.6 g of the chitosan stock solution from Example 16 in a jacketed reactor. An oil phase is prepared by mixing 128.86 g perfume and 32.22 g isopropyl myristate together along with 4.88 g Takenate D-110N at room temperature. The oil phase is added to the water phase under high shear milling to obtain an emulsion with desired particle size. The emulsion is heated to 60° C. over 45 minutes, and then to 95° C. in 60 minutes, and then held at 95° C. for 4 hours, then 1.38 g potassium persulfate added and dissolved, then held at 95° C. for 2 hours, and then cooled down to 25° C. in 90 minutes. The formed capsules have a volume weighted median particle size of 31.68 microns.

Example 17

A water phase is prepared by mixing 433.6 g of the chitosan stock solution from Example 16 in a jacketed reactor. An oil phase is prepared by mixing 128.86 g perfume and 32.22 g isopropyl myristate together along with 4.88 g Takenate D-110N at room temperature. The oil phase is added to the water phase under high shear milling to obtain an emulsion with desired particle size. The emulsion is heated to 60° C. over 45 minutes, and then to 95° C. in 60 minutes, and then held at 95° C. for 4 hours, then 3.90 g potassium persulfate added and dissolved, then held at 95° C. for 2 hours, and then cooled down to 25° C. in 90 minutes. The formed capsules have a volume weighted median particle size of 31.68 microns.

Example 18

An acid and potassium persulfate treated chitosan stock solution is prepared as following. 156.60 g chitosan ChitoClear was dispersed into 3321.0 g deionized water at 25° C. while mixing in a jacketed reactor. 1.57 g potassium persulfate added and dissolved. The pH of the chitosan dispersion is then adjusted to 5.93 using 32.05 g concentrated HCl and 9.29 g 90% Formic Acid under agitation. The temperature of the chitosan solution is then increased to 65° C. over 30 minutes, then to 85° C. over 30 minutes, and then held at 85° C. for 2 hours to hydrolyze and depolymerize the chitosan. The temperature is then reduced to 25° C. after the hydrolyzing step over a period of 90 minutes to obtain the acid and potassium persulfate treated chitosan solution. The solution was combined and homogenized with 360 g of stock solution from example 19. The pH of the chitosan solution is 5.99. The formed chitosan stock solution was used for preparation of capsules in Examples 18 and 19.

A water phase is prepared by mixing 433.5 g of the chitosan stock solution from Example 18 in a jacketed reactor. An oil phase is prepared by mixing 128.86 g perfume and 32.22 g isopropyl myristate together along with 4.88 g Takenate D-110N at room temperature. The oil phase is added to the water phase under high shear milling to obtain an emulsion with desired particle size. The emulsion is heated to 60° C. over 45 minutes, then to 85° C. in 60 minutes, then 0.32 g 30% Hydrogen Peroxide ($H_2O_2$) solution added, and then held at 85° C. for 6 hours, and then cooled down to 25° C. in 90 minutes. The formed capsules have a volume weighted median particle size of 33.89 microns.

Example 19

A water phase is prepared by mixing 433.5 g of the chitosan stock solution from Example 18 in a jacketed reactor. An oil phase is prepared by mixing 128.86 g perfume and 32.22 g isopropyl myristate together along with 4.88 g Takenate D-110N at room temperature. The oil phase is added to the water phase under high shear milling to obtain an emulsion with desired particle size. The emulsion is heated to 60° C. over 45 minutes, then to 85° C. in 60 minutes, then 0.65 g 30% Hydrogen Peroxide solution added, and then held at 85° C. for 6 hours, and then cooled down to 25° C. in 90 minutes. The formed capsules have a volume weighted median particle size of 30.42 microns.

Example 20

An acid and potassium persulfate treated chitosan stock solution is prepared as following. 156.55 g chitosan ChitoClear was dispersed into 3320.0 g deionized water at 25° C. while mixing in a jacketed reactor. 1.58 g potassium persulfate is added and dissolved. The pH of the chitosan dispersion is then adjusted to 5.95 using 32.05 g concentrated HCl and 9.27 g 90% Formic Acid under agitation. The temperature of the chitosan solution is then increased to 65° C. over 30 minutes, then to 85° C. over 30 minutes, and then held at 85° C. for 2 hours to hydrolyze and depolymerize the chitosan. The temperature is then reduced to 25° C. after the hydrolyzing step over a period of 90 minutes to obtain the acid and potassium persulfate treated chitosan solution. The pH of the chitosan solution is 6.00. The formed chitosan stock solution was used for preparation of capsules in Examples 20 and 21.

A water phase is prepared by mixing 433.5 g of the chitosan stock solution from Example 20 in a jacketed reactor. An oil phase is prepared by mixing 128.86 g perfume and 32.22 g isopropyl myristate together along with 4.88 g Takenate D-110N at room temperature. The oil phase is added to the water phase under high shear milling to obtain an emulsion with desired particle size. The emulsion is heated to 60° C. over 45 minutes, then to 85° C. in 60 minutes, then 1.30 g 30% Hydrogen Peroxide solution added, and then held at 85° C. for 6 hours, and then cooled down to 25° C. in 90 minutes. The formed capsules have a volume weighted median particle size of 25.87 microns.

Example 21

A water phase is prepared by mixing 433.5 g of the chitosan stock solution from Example 20 in a jacketed reactor. An oil phase is prepared by mixing 128.86 g perfume and 32.22 g isopropyl myristate together along with 4.88 g Takenate D-110N at room temperature. The oil phase is added to the water phase under high shear milling to obtain an emulsion with desired particle size. The emulsion is heated to 60° C. over 45 minutes, then to 85° C. in 60 minutes, then 3.25 g 30% Hydrogen Peroxide solution added, and then held at 85° C. for 6 hours, and then cooled down to 25° C. in 90 minutes. The formed capsules have a volume weighted median particle size of 25.87 microns.

Various data points related to Comparative Example 3 and Examples 11-21 are reported in Table 8.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

TABLE 8

| | % KPS of chitosan in WP | % KPS of chitosan in Emulsion | % $H_2O_2$ of chitosan in Emulsion | Acid normality ratio (HCl/Formic acid) | Median Particle Size (microns) | Free Oil (%) | 1 Week Leakage (%) | % Aggregates in SUD matrix |
|---|---|---|---|---|---|---|---|---|
| Comparative Example 3 | 0 | 0 | 0 | 100/0 | 10.06 | 0.2 | 36.72 | 104.25% |
| Example 11 | 1 | 0 | 0 | 100/0 | 33.97 | 0.19 | 1.54 | 83.66% |
| Example 12 | 1 | 7.07 | 0 | 100/0 | 36.25 | 0.19 | 1.04 | 9.38% |
| Example 13 | 10 | 0 | 0 | 100/0 | 50.78 | 0.09 | 0.80 | 0.39% |
| Example 14 | 1 | 0 | 0 | 80/20 | 33.48 | 0.18 | 1.33 | 107.96% |
| Example 15 | 1 | 7.07 | 0 | 80/20 | 36.25 | 0.18 | 1.20 | 52.07% |
| Example 16 | 1 | 7.07 | 0 | 60/40 | 31.68 | 0.18 | 1.37 | 58.18% |
| Example 17 | 1 | 20 | 0 | 60/40 | 31.68 | 0.20 | 1.30 | 0.12% |
| Example 18 | 1 | 0 | 0.5 | 60/40 | 33.89 | 0.08 | 1.46 | 82.89% |
| Example 19 | 1 | 0 | 1 | 60/40 | 30.42 | 0.1 | 1.92 | 20.29% |
| Example 20 | 1 | 0 | 2 | 60/40 | 25.87 | 0.15 | 2.16 | 1.51% |
| Example 21 | 1 | 0 | 5 | 60/40 | 25.87 | 0.14 | 1.23 | 0.00% |

Examples 11 to 21 illustrate relative compatibility of delivery particles according to the present disclosure with product matrices such as laundry detergent (e.g., SUD=soluble unit dose article). These are compared to Comparative Example 3. Examples 12 and 17 where redox initiator is added to the water phase and to the emulsion exhibit surprising low leakage, and matrix compatibility attributes. Particles according to the present disclosure also appear to exhibit favorable degradability attributes. The table further suggests that % aggregates can be tuned or adjusted by the amount of redox initiator introduced. The attribute of a high level of compatibility is achieved when the redox initiator is added to the water phase and optionally the emulsion.

Figure 4:
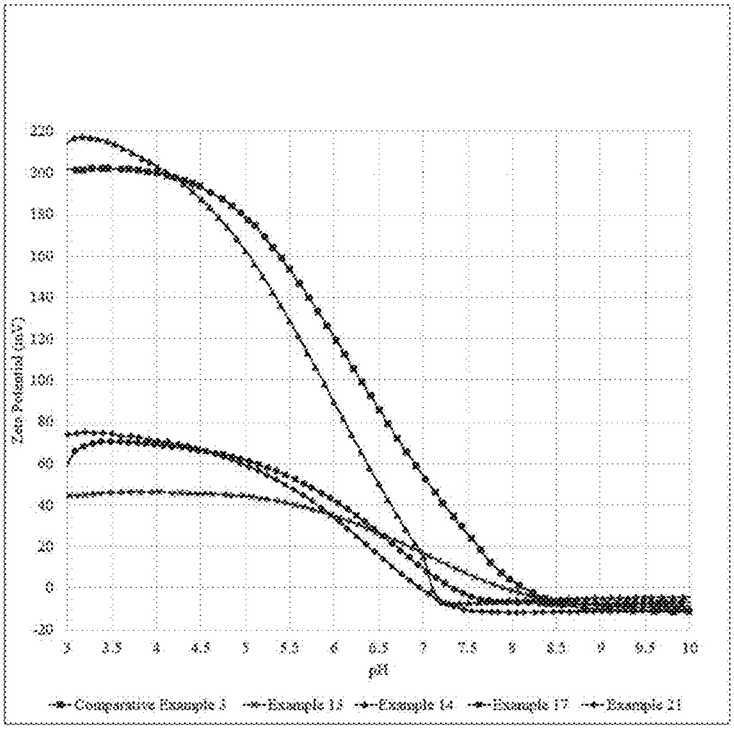
FIG. 4 depicts the charge differences of particles made according to the present disclosure.

Additionally, FIG. 4 depicts the charge difference of delivery particles made according to various treatments, such as acid treatments and redox initiator addition to the water phase or to the emulsion, as described in the indicated example (i.e., Comparative Example 3 and Examples 13, 14, 17, and 21). As the examples show, the steps of the present disclosure enable the zeta potentials to be tailored. For example, the processes of the present disclosure enables lowering or moderating of the zeta potential at pH conditions of use, yielding a more controllable delivery particle, which usefully may be less prone to agglomeration and more compatible with product matrices in end-use applications.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A treatment composition comprising a treatment adjunct and a population of delivery particles, wherein the delivery particles comprise a core and shell surrounding the core, wherein the core comprises a benefit agent, wherein the shell comprises a polymeric material that is the reaction product of a modified chitosan and a cross-linking agent, wherein the shell is substantially free of acrylate, wherein the modified chitosan is formed by treating chitosan with a redox initiator, wherein the redox initiator is selected from the group consisting of a persulfate, a peroxide, and a combination thereof.

2. The treatment composition according to claim 1, wherein the redox initiator is selected from the group consisting of ammonium persulfate, sodium persulfate, potassium persulfate, cesium persulfate, benzoyl peroxide, hydrogen peroxide, and mixtures thereof.

3. The treatment composition according to claim 1, wherein the redox initiator and the chitosan are present in a weight ratio of from about 90:10 to about 0.01:99.99.

4. The treatment composition according to claim 1, wherein the shells of the delivery particles comprise sulfur atoms.

5. The treatment composition according to claim 1, wherein the modified chitosan is formed under acidic conditions at a temperature of at least 25° C.

6. The treatment composition according to claim 1, wherein the modified chitosan is an acid-treated modified chitosan, wherein the chitosan is further treated with an acid, wherein the first acid is a strong acid, and wherein the second acid is a weak acid.

7. The treatment composition according to claim 1, wherein:

(a) the chitosan, prior to treatment with the redox initiator and/or acid, is characterized by a weight average molecular weight of from about 100 kDa to about 600 kDa; and/or (b) the modified chitosan is characterized by a weight average molecular weight of from about 1 kDa to about 600 kDa.

8. The treatment composition according to claim 1, wherein the cross-linking agent comprises a polyisocyanate.

9. The treatment composition according to claim 1, wherein the reaction product is formed in a reaction, wherein the weight ratio of the chitosan present in the reaction to the cross-linker present in the reaction is from about 1:10 to about 1:0.1.

10. The treatment composition according to claim 1, wherein the shell is present in the delivery particles at a level of about 15 wt % or less, by weight of the delivery particles.

11. The treatment composition according to claim 1, wherein the benefit agent is a fragrance material comprising perfume raw materials characterized by a log P of from about 2.5 to about 4.5.

12. The treatment composition according to claim 1, wherein the core further comprises a partitioning modifier.

13. The treatment composition according to claim 1, wherein the delivery particles are characterized by a volume-weighted median particle size from about 1 to about 100 microns.

14. The treatment composition according to claim 1, wherein the delivery particles are obtainable from a process comprising the steps of:

forming a water phase by treating the chitosan with the redox initiator in the presence of water at a pH of 6.5 or less and at a temperature of at least 25° C., to form the modified chitosan, forming an oil phase, the forming step comprising dissolving together at least one benefit agent and at least one cross-linking agent;

forming an emulsion by mixing the oil phase into an excess of the water phase, thereby forming droplets of the oil phase dispersed in the water phase, and optionally adjusting the pH of the emulsion to be in a range from pH 2 to pH 6;

curing the emulsion at a temperature of at least 40° C. for a time sufficient to form a shell at an interface of the droplets with the water phase, the shell comprising the reaction product of the cross-linking agent and the modified chitosan, and the shell surrounding the core comprising the droplets of the oil phase.

15. The treatment composition according to claim 1, wherein the delivery particles are cationic.

16. The treatment composition according to claim 1, wherein the modified chitosan is further modified with a modifying compound, wherein the modifying compound comprises an epoxide, an aldehyde, an $\alpha,\beta$-unsaturated compound, or a combination thereof.

17. The treatment composition according to claim 1, wherein the shells of the delivery particles degrade at least 60% in 60 days when tested according to test method OECD 301B.

18. The treatment composition according to claim 1, wherein the treatment adjunct is selected from the group consisting of surfactants, conditioning actives, deposition aids, rheology modifiers, structurants, bleach systems, stabilizers, builders, chelating agents, dye transfer inhibiting agents, dispersants, enzymes, enzyme stabilizers, catalytic metal complexes, polymeric dispersing agents, clay and soil removal/anti-redeposition agents, brighteners, suds suppressors, silicones, hueing agents, aesthetic dyes, neat perfume, additional perfume delivery systems, structure elasticizing agents, carriers, hydrotropes, processing aids, anti-agglomeration agents, coatings, formaldehyde scavengers, pigments, and mixtures thereof.

19. The treatment composition according to claim 1, wherein the treatment adjunct comprises anionic surfactant, a cationic conditioning agent, or a mixture thereof.

20. The treatment composition according to claim 1, wherein the treatment composition is a fabric care composition, a hard surface cleaner composition, a dish care composition, a hair care composition, a body cleansing composition, or a mixture thereof.

* * * * *